(12) United States Patent  
Muirhead

(10) Patent No.: US 6,749,418 B2
(45) Date of Patent: Jun. 15, 2004

(54) TRIPLE SHEET THERMOFORMING APPARATUS

(76) Inventor: Scott A. W. Muirhead, R.R.3 Box 712X, Uniontown, PA (US) 15401

( * ) Notice: Subject to any disclaimer, the term of this patent is extended or adjusted under 35 U.S.C. 154(b) by 371 days.

(21) Appl. No.: 09/898,457

(22) Filed: Jul. 5, 2001

(65) Prior Publication Data

US 2002/0058082 A1 May 16, 2002

Related U.S. Application Data

(63) Continuation-in-part of application No. 09/377,792, filed on Aug. 20, 1999, now Pat. No. 6,294,114.
(60) Provisional application No. 60/097,200, filed on Aug. 20, 1998.

(51) Int. Cl.[7] .............................................. B29C 51/18
(52) U.S. Cl. ........................ 425/515; 425/183; 425/195; 425/388
(58) Field of Search ................................ 425/503, 504, 425/515, 183, 195, 388, 405.1; 268/248, 545; 156/285

(56) References Cited

U.S. PATENT DOCUMENTS

| | | |
|---|---|---|
| 3,398,434 A | 8/1968 | Alesi, Jr. et al. |
| 3,583,036 A | 6/1971 | Brown |
| 3,597,799 A | 8/1971 | Earle |
| 3,695,188 A | 10/1972 | Granatstein |
| 3,702,100 A | 11/1972 | Wharton |
| 3,779,687 A | 12/1973 | Alesi |
| 3,783,078 A | 1/1974 | Brodhead |
| 3,787,158 A | 1/1974 | Brown et al. |
| 3,867,088 A | 2/1975 | Brown et al. |
| 3,868,209 A | 2/1975 | Howell |
| 3,919,382 A | 11/1975 | Smarook |
| 3,919,445 A | 11/1975 | Smarook |
| 3,919,446 A | 11/1975 | Smarook |
| 3,925,140 A | 12/1975 | Brown |
| 3,964,400 A | 6/1976 | Brand |
| 4,013,021 A | 3/1977 | Steinlein et al. |

(List continued on next page.)

FOREIGN PATENT DOCUMENTS

WO  WO 99/64221  12/1999

OTHER PUBLICATIONS

Cleveland Consulting Associates, Recommendations on the Grocery Industry Pallet System, 1989. Grocery Manufactures of America, Inc. Washington, DC.
Clyde E. Witt, Guideline for Plastic Pallet, Material Handling Engineering, Sep. '98, p. 22.
Clyde E. Witt, What You Need to Know About Plastic Pollets, Material Handling Engineering, Sep. '98 pp. 57–63.
Peter Mapleston, Plastic Set to Take a Share of Market for Wood Pallets, Jul. '98, pp. 68–73.
Adertisement, Molding the Future, Menasha Corporation, Material Handling Engineering, Sep. '98.

Primary Examiner—James P. Mackey
Assistant Examiner—Donald Heceknberg
(74) Attorney, Agent, or Firm—Harness, Dickey & Pierce, P.L.C.

(57) ABSTRACT

A thermoforming machine for manufacturing triple sheet thermoplastic articles is disclosed. The thermoforming machine comprises three controllable ovens for heating three sheets to a heat deformable temperature, three shape giving molds for separately thermoforming each sheet in succession, and forging-like means to compress the three thermoformed sheets into a unitary article. The three sheets are thermoformed and compressed together in a form station comprising upper and lower platens. Acting with the upper platen is a mold shuttle system for moving two of three molds into position relative the thermoforming and forging-like operations of the apparatus.

9 Claims, 15 Drawing Sheets

U.S. PATENT DOCUMENTS

| | | |
|---|---|---|
| 4,070,839 A | 1/1978 | Clem |
| 4,079,232 A | 3/1978 | Brokoff et al. |
| 4,101,252 A | 7/1978 | Brown |
| 4,113,909 A | 9/1978 | Beasley |
| 4,133,270 A | 1/1979 | Ravera |
| 4,158,539 A | 6/1979 | Arends et al. |
| 4,164,387 A | 8/1979 | Schermutzki et al. |
| 4,164,389 A | 8/1979 | Beasley |
| 4,194,663 A | 3/1980 | West et al. |
| 4,244,915 A | 1/1981 | Boardman |
| 4,255,382 A | 3/1981 | Arends et al. |
| 4,287,836 A | 9/1981 | Aoki |
| 4,348,442 A | 9/1982 | Figge |
| 4,377,377 A | 3/1983 | Arends et al. |
| 4,428,306 A | 1/1984 | Dresen et al. |
| 4,464,329 A | 8/1984 | Whiteside et al. |
| 4,488,496 A | 12/1984 | Polacco |
| 4,507,348 A | 3/1985 | Nagata et al. |
| 4,509,432 A | 4/1985 | Win |
| 4,509,909 A | 4/1985 | Arends |
| 4,513,048 A | 4/1985 | Kaube et al. |
| 4,531,901 A | 7/1985 | Andersen |
| 4,555,381 A | 11/1985 | Chazal et al. |
| 4,600,376 A | 7/1986 | Gillman et al. |
| 4,606,278 A | 8/1986 | Shuert |
| 4,608,009 A | 8/1986 | Whiteside et al. |
| 4,636,348 A | 1/1987 | Whiteside |
| 4,649,007 A | 3/1987 | Bonis et al. |
| 4,666,544 A | 5/1987 | Whiteside et al. |
| 4,742,781 A | 5/1988 | Shuert |
| 4,846,077 A | 7/1989 | Win |
| 4,907,515 A | 3/1990 | Win |
| 4,969,812 A | 11/1990 | Brown |
| 5,007,225 A | 4/1991 | Teasdale |
| 5,030,501 A | 7/1991 | Colvin et al. |
| 5,042,396 A | 8/1991 | Shuert |
| 5,046,434 A | 9/1991 | Breezer et al. |
| 5,071,603 A | 12/1991 | Kurumaji et al. |
| 5,088,418 A | 2/1992 | Reckermann et al. |
| 5,108,529 A | 4/1992 | Shuert |
| 5,117,762 A | 6/1992 | Shuert |
| 5,123,359 A | 6/1992 | DelBalso |
| 5,123,541 A | 6/1992 | Giannini et al. |
| 5,143,778 A | 9/1992 | Shuert |
| 5,156,782 A | 10/1992 | Ballantyne |
| 5,164,211 A | 11/1992 | Comer |
| 5,167,969 A | 12/1992 | DeMaio, Jr. et al. |
| 5,168,817 A | 12/1992 | Nulle et al. |
| 5,197,395 A | 3/1993 | Pigott et al. |
| 5,197,396 A | 3/1993 | Breezer et al. |
| 5,225,213 A | 7/1993 | Brown et al. |
| 5,226,373 A | 7/1993 | Esch |
| 5,255,613 A | 10/1993 | Shuert |
| 5,283,028 A | 2/1994 | Breezer et al. |
| 5,283,029 A | 2/1994 | Ellemor |
| 5,329,861 A | 7/1994 | McCarthy |
| 5,329,862 A | 7/1994 | Breezer et al. |
| 5,337,681 A | 8/1994 | Schrage |
| 5,351,627 A | 10/1994 | Junaedi |
| 5,351,628 A | 10/1994 | Breezer et al. |
| 5,351,629 A | 10/1994 | Breezer et al. |
| 5,367,960 A | 11/1994 | Schleicher |
| 5,367,961 A | 11/1994 | Arai et al. |
| 5,390,467 A | 2/1995 | Shuert |
| 5,391,251 A | 2/1995 | Shuert |
| 5,401,347 A | 3/1995 | Shuert |
| 5,402,735 A | 4/1995 | DeJean |
| 5,404,829 A | 4/1995 | Shuert |
| 5,407,632 A | 4/1995 | Constantino et al. |
| 5,408,937 A | 4/1995 | Knight, IV et al. |
| 5,413,052 A | 5/1995 | Breezer et al. |
| 5,427,732 A | 6/1995 | Shuert |
| 5,470,641 A | 11/1995 | Shuert |
| 5,492,069 A | 2/1996 | Alexander et al. |
| 5,505,141 A | 4/1996 | Barber |
| 5,527,585 A | 6/1996 | Needham et al. |
| 5,531,585 A | 7/1996 | Lupke |
| 5,535,668 A | 7/1996 | Besaw et al. |
| 5,555,820 A | 9/1996 | Shuert |
| 5,596,933 A | 1/1997 | Knight et al. |
| 5,606,921 A | 3/1997 | Elder et al. |
| 5,620,715 A | 4/1997 | Hart et al. |
| 5,624,622 A | 4/1997 | Boyce et al. |
| 5,624,630 A | 4/1997 | Breezer et al. |
| 5,635,129 A | 6/1997 | Breezer et al. |
| 5,635,306 A | 6/1997 | Minamida et al. |
| 5,638,760 A | 6/1997 | Jordan et al. |
| 5,687,652 A | 11/1997 | Ruma |
| 5,716,581 A | 2/1998 | Tirrell et al. |
| 5,755,162 A | 5/1998 | Knight et al. |
| 5,769,003 A | 6/1998 | Rose et al. |
| 5,778,801 A | 7/1998 | Delacour |
| 5,782,129 A | 7/1998 | Vanderzee et al. |
| 5,791,262 A | 8/1998 | Knight et al. |
| 5,794,542 A | 8/1998 | Besaw |
| 5,794,544 A | 8/1998 | Shuert |
| 5,800,846 A | 9/1998 | Hart |
| 5,813,355 A | 9/1998 | Brown et al. |
| 5,814,185 A | 9/1998 | Chun et al. |
| 5,830,299 A | 11/1998 | Teixidor Casanovas et al. |
| 5,836,255 A | 11/1998 | Uitz |
| 5,843,366 A | 12/1998 | Shuert |
| 5,845,588 A | 12/1998 | Gronnevik |
| 5,860,369 A | 1/1999 | John et al. |
| 5,862,760 A | 1/1999 | Kohlhaas |
| 5,868,080 A | 2/1999 | Wyler et al. |
| 5,879,495 A | 3/1999 | Evans |
| 5,885,691 A | 3/1999 | Breezer et al. |
| 5,894,803 A | 4/1999 | Kuga |
| 5,900,203 A | 5/1999 | Needham et al. |
| 5,921,189 A | 7/1999 | Estepp |
| 5,950,545 A | 9/1999 | Shuert |
| 5,950,546 A | 9/1999 | Brown et al. |
| 5,967,057 A | 10/1999 | Nakayama et al. |
| 5,975,879 A | 11/1999 | Dresen et al. |
| 5,980,231 A | 11/1999 | Arends et al. |
| 5,993,724 A | 11/1999 | Shuert |
| 5,996,508 A | 12/1999 | Constantino et al. |
| 6,006,677 A | 12/1999 | Apps et al. |
| 6,018,927 A | 2/2000 | Major |
| 6,021,721 A | 2/2000 | Rushton |
| 6,029,583 A | 2/2000 | LeTrudet |
| 6,199,488 B1 | 3/2001 | Favaron et al. |
| 6,200,122 B1 | 3/2001 | Chun et al. |

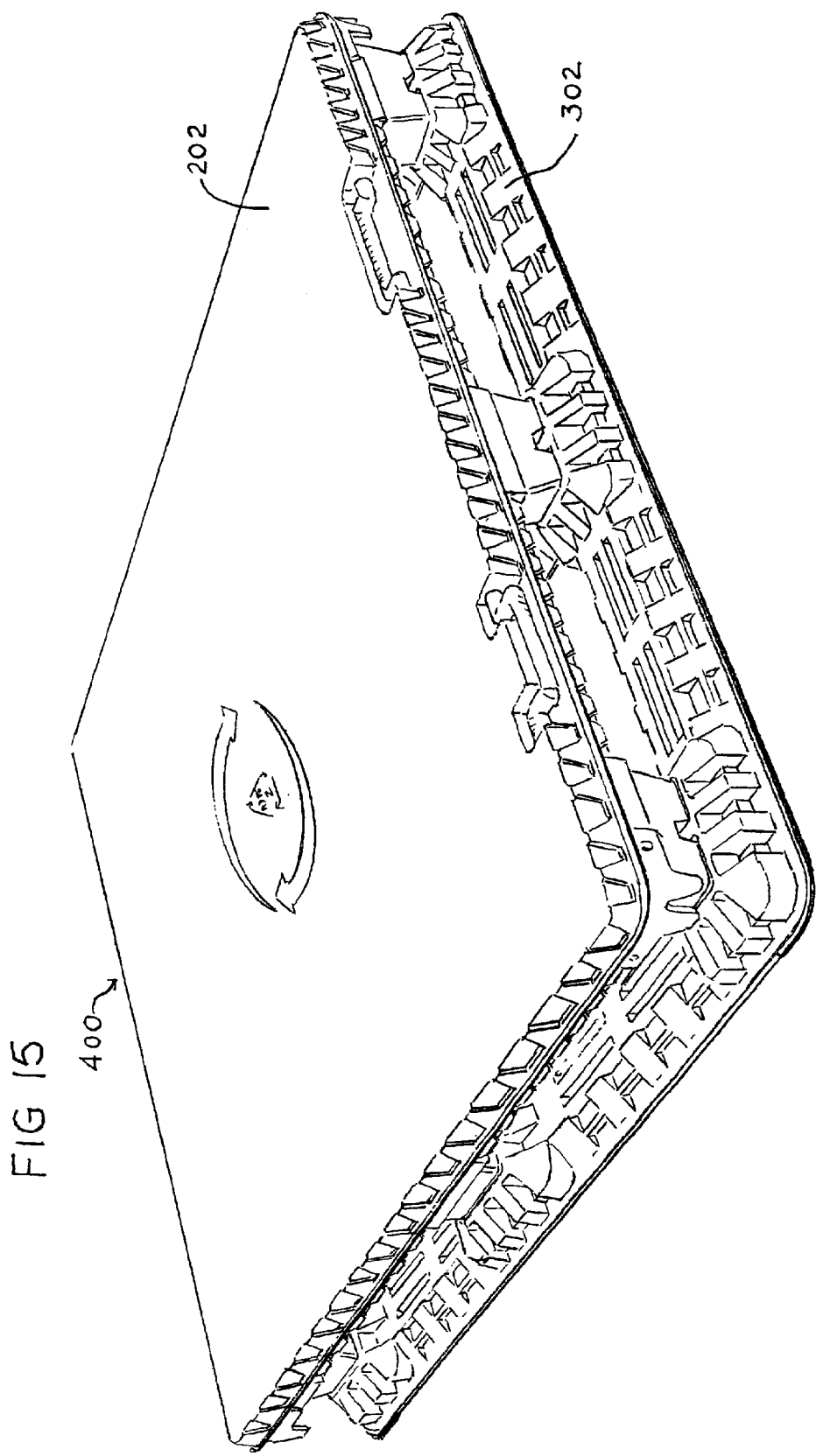

FIG 16

CHART 1 - OPERATING FUNCTIONS OF APPARATUS

| | STATION ONE | | STATION TWO | STATION THREE | SHUTTLE | STATION FOUR | | | | | | | | |
|---|---|---|---|---|---|---|---|---|---|---|---|---|---|---|
| | UNLOAD | LOAD | OH1 | OH2 | OH3 | | LPE | UPE | VF | PF | LPR | UPR | FRAMES | DWELL | TOTAL TIME | ROTATE |
| CYCLE 1 SHEET 1 | | 11 | 9 | | | | | | | | | | | | | |
| CYCLE 2 SHEET 1 | | 11 | 10.5 | 20.5 | | | | | | | | | | | | |
| SHEET 2 | | | | | | | | | | | | | | | | |
| CYCLE 3 SHEET 1 | | 11 | 18.5 | 29.5 | 29.5 | | | | | | | | | | | |
| SHEET 2 | | | | | | | | | | | | | | | | |
| SHEET 3 | | | | | | | | | | | | | | | | |
| CYCLE 4 FORM 1 | | | | | | | 3.5 | 3.5 | 1.5 | 5 | 3.5 | 3.5 | 1.5 | 10 | 20 | 5 |
| SHEET 2 | | 11 | 9 | 20 | 20 | | | | | | | | | | | |
| SHEET 3 | | | | | | | | | | | | | | | | |
| SHEET 4 | | | | | | | | | | | | | | | | |
| CYCLE 5 FORM 1/2 | | | | | 27.5 | 16.5 | 2 | 3.5 | 2 | 5 | | | 1.5 | 10 | 27.5 | 5 |
| SHEET 3 | | 11 | 16.5 | 27.5 | | | | | | | | | | | | |
| SHEET 4 | | | | | | | | | | | | | | | | |
| SHEET 5 | | | | | | | | | | | | | | | | |
| CYCLE 6 FORM 1/2/3 | | | | | 32 | | 1.5 | 3.5 | 2 | 10 | 3.5 | 3.5 | 1.5 | 10 | 32 | 5 |
| SHEET 4 | | 11 | 21 | 32 | | | | | | | | | | | | |
| SHEET 5 | | | | | | | | | | | | | | | | |
| SHEET 6 | | | | | | | | | | | | | | | | |
| CYCLE 7 PART 1 | 6 | | | | 20 | | 3.5 | 3.5 | 1.5 | 5 | | | 1.5 | 10 | 20 | 5 |
| FORM 4 | | 11 | 3 | 20 | | | | | | | | | | | | |
| SHEET 5 | | | | | | | | | | | | | | | | |
| SHEET 6 | | | | | | | | | | | | | | | | |
| SHEET 7 | | | | | | | | | | | | | | | | |
| CYCLE 8 FORM 4/5 | | | | | 27.5 | 16.5 | 2 | 3.5 | 2 | 5 | | | 1.5 | 10 | 27.5 | 5 |
| SHEET 6 | | 11 | 16.5 | 27.5 | | | | | | | | | | | | |
| SHEET 7 | | | | | | | | | | | | | | | | |
| SHEET 8 | | | | | | | | | | | | | | | | |
| CYCLE 9 FORM 4/5/6 | | | | | 32 | | 1.5 | 3.5 | 2 | 10 | 3.5 | 3.5 | 1.5 | 10 | 32 | 5 |
| SHEET 7 | | 11 | 21 | 32 | | | | | | | | | | | | |
| SHEET 8 | | | | | | | | | | | | | | | | |
| SHEET 9 | | | | | | | | | | | | | | | | |
| CYCLE 10 PART 2 | 6 | | | | 20 | | 3.5 | 3.5 | 1.5 | 5 | | | 1.5 | 10 | 20 | 5 |
| FORM 7 | | 11 | 3 | 20 | | | | | | | | | | | | |
| SHEET 8 | | | | | | | | | | | | | | | | |
| SHEET 9 | | | | | | | | | | | | | | | | |
| SHEET 10 | | | | | | | | | | | | | | | | |

(Annotations: 80, 252)

FIG 17

CHART 2- TIME EACH SHEET SPENDS IN EACH OVEN IN SECONDS

|         | OVEN 1 | OVEN 2 | OVEN 3 | TOTAL |
|---------|--------|--------|--------|-------|
| SHEET 7 | 3      | 27.5   | 32     | 62.5  |
| SHEET 8 | 16.5   | 32     | 20     | 68.5  |
| SHEET 9 | 21     | 20     | 27.5   | 68.5  |
| TOTAL   | 40.5   | 79.5   | 79.5   | 199.5 |

CHART 3 – AMOUNT OF HEAT ENERGY RECEIVED BY EACH SHEET IN EACH OVEN IN PERCENT

|         | OVEN 1 | OVEN 2 | OVEN 3 | TOTAL |
|---------|--------|--------|--------|-------|
| SHEET 7 | 5%     | 44%    | 51%    | 100%  |
| SHEET 8 | 24%    | 47%    | 29%    | 100%  |
| SHEET 9 | 31%    | 29%    | 40%    | 100%  |
| TOTAL   | 20%    | 40%    | 40%    | 100%  |

CHART 4 – REGULATED HEAT ENERGY PUTPUT FOR EACH SHEET

|               | OVEN 1 | OVEN 2 | OVEN 3 |
|---------------|--------|--------|--------|
| FIRST SHEET   | 40%    | 67%    | 78%    |
| SHECOND SHEET | 55%    | 71%    | 44%    |
| THIRD SHEET   | 70%    | 44%    | 61%    |

Chart 5. Triple Sheet Controlled Heater Output

Chart 6: Twin Sheet Constant Heater Output

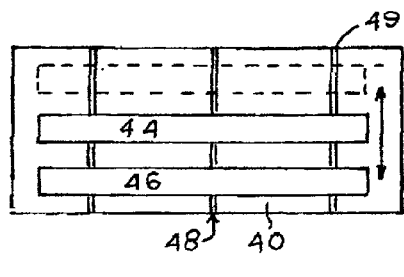
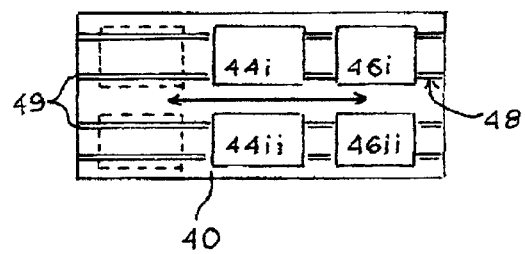
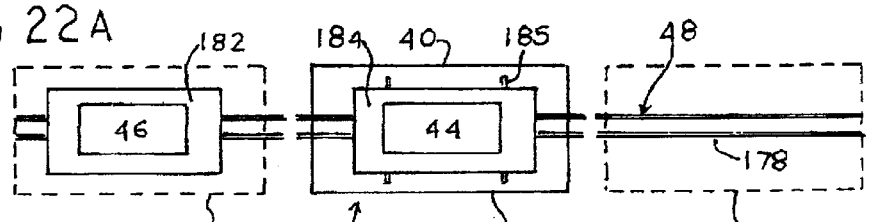
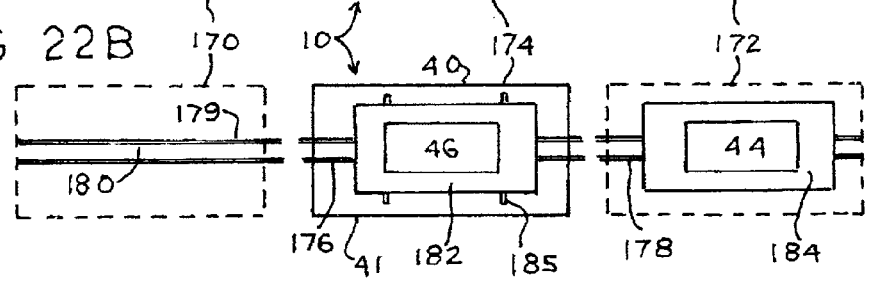
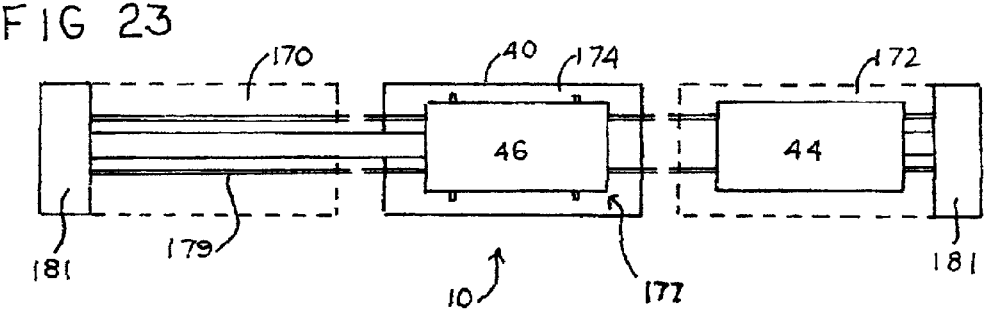

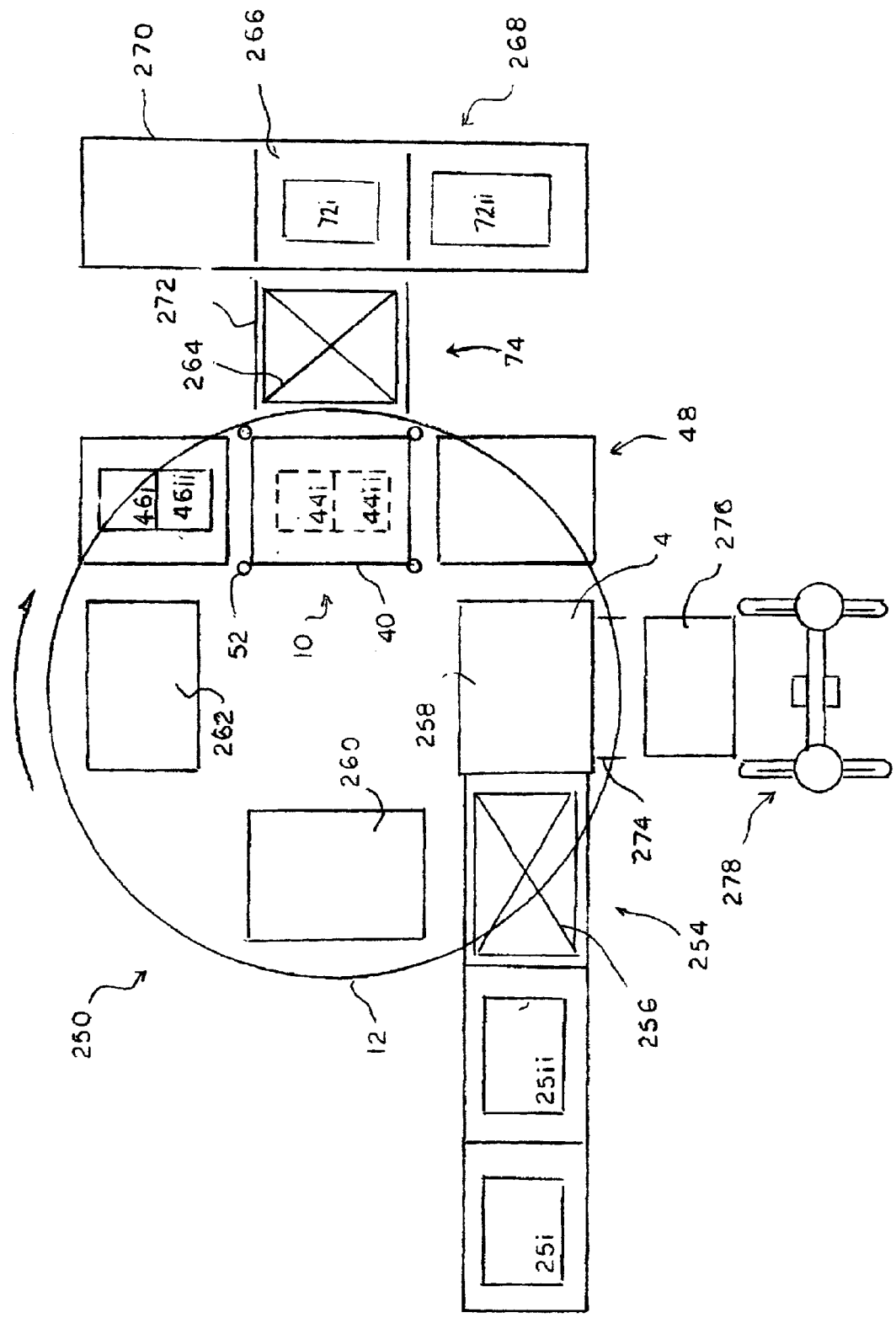

TRIPLE SHEET THERMOFORMING APPARATUS

CROSS-REFERENCE TO RELATED APPLICATION

This application is a continuation-in-part of U.S. patent application Ser. No. 09/377,792 filed on Aug. 20, 1999, which is now issued as U.S. Pat. No. 6,294,144. This application claims the benefit of U.S. Provisional Application No. 60/097,200, filed on Aug. 20, 1998.

TECHNICAL FIELD

The present invention relates to thermoforming apparatus and, in particular, to a thermoforming machine for thermoforming three thermoplastic sheets over three thermoforming molds to produce an instant a unitary triple sheet article.

DESCRIPTION OF THE PRIOR ART

The art of twin sheet thermoforming is well known and has been practiced extensively in recent years in the construction of plastic articles. Twin sheet thermoforming has at least two intended purposes which include the production of hollow articles having greater strength than similar articles formed from a single sheet of thermoplastic, and the consolidation of more than one thermoplastic sub-component into a single unitary article.

The apparatus of twin sheet thermoforming was pioneered by a handful of inventors in the late Sixties and early Seventies. A number of different types of twin sheet apparatus were developed and implemented during this period of time. Examples of these early types of twin sheet thermoforming apparatus may be known by referring to U.S. Pat. Nos. 3,398,434 to Alesi, Jr., et al., 3,583,036 to Brown, 3,597,799 to Earle, 3,779,687 to Alesi, 3,783,078 to Brodhead, 3,787,158 and 3,867,088 to Brown et al.

The basic apparatus and principles of twin sheet thermoforming preferred by practitioners, as of the time of the present invention, are disclosed in U.S. Pat. Nos. 3,868,209 to Howell and 3,925,140 to Brown. In fact, Brown Machine LLC, of Beaverton Mich., is internationally renown as the premier manufacturer of twin sheet thermoforming machinery. Several other machinery manufacturers, domestic and foreign, offer twin sheet thermoforming apparatus based upon the principles of the '209 and '140 inventions in the rotary machine configuration. Although other twin sheet machine configurations are offered, such as linear machine configurations, the rotary style is much preferred for its inherent short cycle time.

A wide variety of small and large articles thermoformed according to the twin sheet methodology are found in a large number of primary end markets including recreational and sporting goods, building and construction, automotive and transportation, marine, agricultural, appliance, industrial and consumer products to name a few. However, the largest end-market application to which twin sheet thermoforming apparatus has been widely applied involves industrial platforms such material handling pallets and the like.

The traditional wood pallet is an integral part of America's distribution system, and is involved in one way or another in the movement and storage of the vast majority of goods within the economy. Wood pallets however have a large number of problems that well known and plastic pallets have been used to some advantage in recent years. While plastic pallets are attractive for a number of known reasons, they still have two significant shortcomings. Most notably, plastic pallets deform under heavy load and unless reinforced with steel, wood or the like, do not provide acceptable strength. Secondly, plastic materials are more expensive than wood materials and a relatively large amount of plastic is used to make a pallet comparable in strength to wood. Therefore, plastic pallets are considerably more expensive than wooden pallets.

One to the most successful types of plastic pallets is a twin sheet thermoformed pallet. Twin sheet pallets are generally constructed out of two thermoplastic sheets according to the principles and apparatus of '140. An early example of a pallet formed in this general character is disclosed in U.S. Pat. No. 4,428,306 to Dresen et al. The two significant shortcomings associated with plastic pallets are not, however, overcome with twin sheet thermoforming.

Phil Araman of the United States Forest Service has estimated that there are 1.9 billion pallets within the U.S. distribution system, and that roughly 400 million new pallets are added to maintain the over-all inventory each year. Of this annual volume, twin sheet thermoformed pallets reportedly only account for roughly 1.4 million units. Therefore, the practitioners of twin sheet thermoforming have attempted in recent years to improve the art of twin sheet thermoforming to overcome the significant shortcomings noted above in order to capture a larger share of the over-all pallet market. Some of the more notable apparatus improvements may be known by referring to U.S. Pat. Nos. 5,620,715 to Hart et al., 5,800,846 to Hart, 5,975,879 and 6,086,354 to Dresen et al., and 5,658,523 and 5,843,366 to Shuert. Upon close inspection of these improvements, it will become readily apparent that the significant shortcomings have not yet been overcome in the prior art. The improved apparatus referenced has only provided incremental improvement results and the basic apparatus still yields twin sheet pallets that have relatively low load bearing strength and remain expensive compared to wooden pallets.

Although the art of twin sheet thermoforming has resulted in improved products in a wide variety of applications and end markets, a range of needs nonetheless exists to advance thermoforming methods and apparatus to overcome such specific weaknesses as have been mentioned above, and more generally, to further increase the strength, lower the costs or improve the quality of articles constructed of thermoplastic materials.

It has been suggested that three or more sheets of thermoplastic can be combined in a form analogous to a honeycomb construction in order to overcome a wide range of strength related problems, cost issues and to achieve parts consolidation benefits. Continuing with the present example of plastic pallets, in U.S. Pat. No. 5,470,641 a routine twin sheet panel structure is over and/or under laid with separate (coextensive) sheets in separate forging like operations to provide a panel structure with one or more flat face plates. In yet another example, which is understood best by referring to U.S. Pat. No. 4,348,442, a structural panel substantially equivalent to the panel structure of '641 is disclosed. There are a number of problems that would be readily apparent to those skilled in the pertinent arts with respect to the end products associated with these disclosures. First, it will be appreciated by referring to U.S. Pat. No. 3,919,446 that the twin sheet structure of '641, in particular, would be more economically achieved by the single sheet expansion process of '446. Secondly, the perimeter borders of '641 and '442 are normally open and could collect or retain contaminants associated within material handling environments. Third, the secondary operations of fusing, screwing and bonding the separate thermoplastic sub-components together would be difficult and costly to implement. Fourth, except as may be anticipated by '442, the approach of '641 is not amenable for use as a pallet structure in which legs are required for the receipt of pallet handling equipment and machinery. Fifth, as is well know, and as first taught by U.S. Pat. No. 4,428,306, single walled thermoplastic legs are not strong enough to support the tremendous static loads required by industry. Sixth, it is critical to provide a wide spread and permanent interfacial connection between all of the mating surfaces of the thermoplastic sub-components forming the referenced hybrid honeycomb panel structures in order to achieve maximum load bearing and anti-delaminating strength. The assembly methods inferred and or suggested by '641 and '442 would not be amenable to such wide spread and permanent interfacial unions, with the result that the articles would not be optimally robust. Seventh, the introduction of aggregates, fillers, agents, adhesives, fasteners and other non-thermoplastic joinery would create problems with respect to the recycling of the reference multi-sheet panel structures at the end of their useful lives.

Therefore, although triple, even quadruple sheet thermoplastic constructions would enjoy the theoretical strength advantages associated with honeycomb sandwich constructions, the art of thermoforming has not yet been advanced to a point where at least three thermoplastic sheets could be instantly thermoformed over three shape-giving molds to provide unitary articles that overcome the problems that by way of example have now been identified.

SUMMARY OF THE INVENTION

It is, therefore, the objective of the present invention to provide a machine for thermoforming three sheets of thermoplastic over three molds to provide, in an instant manufacturing process, a unitary triple sheet thermoplastic article.

Accordingly, an object of the present invention is to provide a machine having three ovens within which three sheets of thermoplastic can be simultaneously heated to a thermoformable state. The object is accomplished by providing three ovens comprising five oven banks, with the first oven bank uniquely positioned at the load/unload station above the wheel supporting the clamp frames that hold the individual sheets forming a triple sheet article. Although the fifth oven in the present embodiment is positioned over the load/unload station characteristic of a four-station rotary machine, this aspect can be accomplished in a five or six station rotary configuration.

According to a further aspect of this object, the three ovens comprising the five oven banks each include a plurality of infrared emitters. As each of the three sheets progress through each of the three ovens means regulating emitter output are precisely controlled to ensure that the over-all amount of heat transferred to each of the three sheets is controllable and therefore adjustable according to the length of time each of the three sheets dwells in each of the three ovens. According to this aspect, each emitter of each oven bank is controlled to emit more or less heat energy relative the heat absorption characteristics of the individual sheets of thermoplastic and the varying length of time each sheet dwells within each of three ovens.

Still according to this aspect, the invention includes means adjusting the vertical position of the first oven bank relative the wheel supporting the clamp frames carrying the plastic sheets in order to prevent triple sheet articles from impacting the first oven bank as the article is indexed forward from a from station to the load/unload station.

Another object of the invention is to provide means controlling the operation of the clamp frames. According to this aspect, means are provided for a three sheet sequence in which case programmable logic control is required to ensure the clamp frames respond to proper open or close operating functions at the form station.

Still according to this aspect, pivotally opposed pin bars mounted to co-acting solenoid operated cylinders are suggested in order to enable various modes of the invention to be used. Pivotally opposed pin bars allow the formed sheets of thermoplastic at the form station to be extracted to a position above or below a sheet line associated with the path traveled by the wheel as preferred by the thermoforming practitioner.

Another object of the invention is to provide means delivering three shape-giving molds that each separately thermoform one of the three sheets of thermoplastic of the unitary article. According to this aspect the machine has a form station comprising opposed platens that travel vertically from open positions to closed positions where the three sheets of thermoplastic are sequentially thermoformed over the three molds.

According to this aspect the opposed platens are developed to support and carry three molds into positions relative for thermoforming. In this connection, associated with at least one platen is a mold shuttle system, the mold shuttle system providing means to laterally shift one of two molds into position upon the associated platen for vertical movement into positions relative for thermoforming.

According still to this aspect, means are provided to control the open and closed positions of the platens relative for thermoforming three sheets over three molds and for operation of the mold shuttle system.

Yet another object of the invention is to sequentially compress the formed sheets of thermoplastic between the molds supported upon the platens to first provide a twin sheet sub-assembly and then a unitary triple sheet article. According to this aspect the platens are closed in a manner having the attributes of a forging operation. Means for implementing the forging-like operation first between a first set of molds and next between a second set of molds are provided.

According to still yet another object, a machine frame to support the equipment associated with the apparatus is disclosed in connection with a rotary machine configuration, although a liner machine frame falls within the scope of the invention.

Other features, objects and advantages of the present invention apparatus will become apparent from the following description and appended claims when viewed in conjunction with the accompanying drawings.

DESCRIPTION OF THE DRAWINGS

FIG. 15 is a perspective view showing the combination of the article shown in FIGS. 4 and 11;

FIG. 16 contains Charts 1, which characterizes the operation of the apparatus;

FIG. 17 contains Charts 2, 3 and 4, which summarize the operation of the ovens relative the three sheets thermoformed by the apparatus;

FIGS. 21A and 21B are plan views of two embodiments of mold shuttle systems confined inside a platen;

FIGS. 22A and 22B are plan views showing the relative movement of another embodiment of the mold shuttle system of the preferred apparatus; and FIG. 23 is a plan view suggesting yet another alternate means for operation of a mold shuttle system of the apparatus of triple sheet thermoforming.

FIG. 24 is a plan view of an exemplary automated triple sheet thermoforming work cell.

DETAILED DESCRIPTION OF THE PREFERRED EMBODIMENTS

Figure 1:
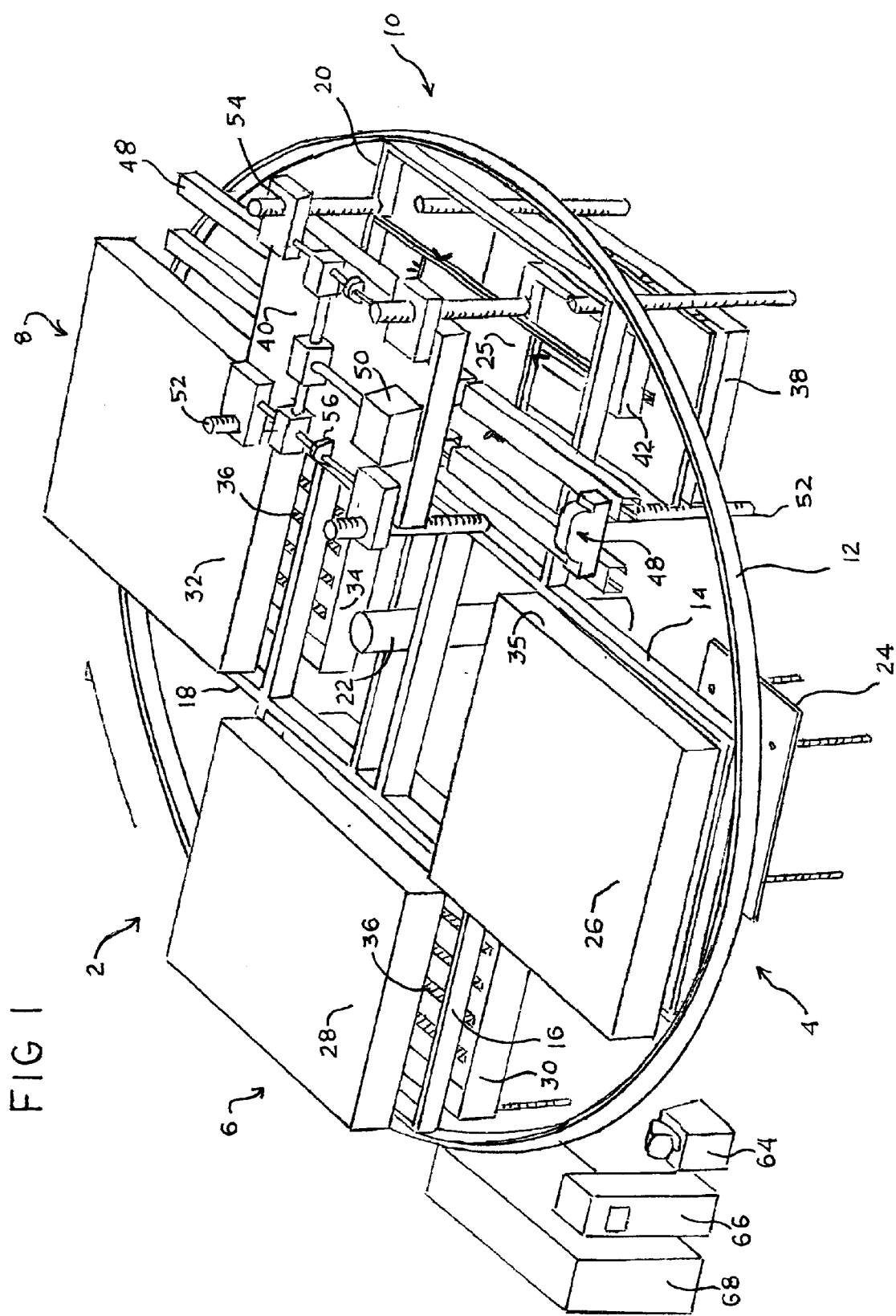
FIG. 1 is a perspective view of one embodiment of a triple sheet thermoforming machine.

A triple sheet thermoforming machine 2, as broadly considered in FIG. 1, includes a first load/unload station 4, a second oven station 6, a third oven station 8, and a fourth forming station 10. Although the arrangement of the preferred machine is configured in a rotary style having four quadrants, five and six quadrant machine configurations fall within the scope of the invention. Further, although a rotary configuration is preferred, a linear machine configuration can also be developed falling within the scope of the present invention.

Also included in the preferred four station rotary machine configuration is a wheel 12, the wheel comprising a first clamp frame 14, a second clamp frame 16, a third clamp frame 18 and a fourth clamp frame 20. The clamp frames support the thermoplastic sheets around their edges and carry the sheets through the machine. Wheel 12 rotates clockwise or counterclockwise, depending upon the preference of the practitioner, about a central shaft 22, and is driven by a suitable controllable motor (not shown) in a known manner. The perimeter margin of the wheel is supported upon rollers that are mounted upon the machine frame in known manner.

First load/unload station 4 includes a load/unload table 24, which operates in vertical motion to successively deliver thermoplastic sheet 25 to frames 14, 16, 18 and 20 and to receive articles from the form station for extraction from the machine. Although the apparatus may be charged with sheet manually, it is known in the industry that automated sheet delivery systems interfacing with the load/unload station can be deployed to serve a number of known purposes. Furthermore, it is also know that dissimilar sheet may be utilized in the construction of unitary articles, and therefore the automated sheet delivery system may be adapted to selectively charge the apparatus with a plurality of dissimilar sheet stored in adjacent piles, as will be more fully described below.

At the first load/unload station 4, above the wheel, resides a first top heater bank 26. At the second oven station 6 is a second top heater bank 28 and a first bottom heater bank 30. At the third oven station 8 is a third top heater bank 32 and a second bottom heater bank 34. The five heater banks 26, 28, 30, 32 and 34 are shrouded in sheet metal 35 to contain and reflect the radiant energy emitted from electric infrared heaters 36 to the heat absorbing thermoplastic sheets. First top heater bank 26 operates to travel upward to prevent articles rotating into load/unload station 4 from form station 10 from impacting against sheet metal 35 shrouding oven 26. First top heat bank 26 is optionally and selectively controlled to travel upward at the end of each complete part production cycle.

The fourth forming station 10 comprises a lower platen 38 and an upper platen 40. The platens are opposed in vertical alignment and travel from open positions to closes positions, as will be described in more detail below. Upon lower platen 38 resides thermoforming mold 42. Associated with upper platen 40 are thermoforming molds 44 and 46. Interfacing with the upper platen 40 is a mold shuttle system 48. The mold shuttle system operates to selectively shift thermoforming molds 44 and 46 laterally into position upon the platen 40, in a position vertically aligned with opposed mold 42 and frames 14, 16, 18 and 20 as these traverse into the form station 10 from the third oven station.

The lower and upper platens each include platen drive motors 50 that function to selectively open and close the platens to precise positions relative the operation of the apparatus. The press-like functions of the platens are stabilized and guided by a pair of column like gear posts 52 adjacent the four corners of each platen. Interfacing bearings 54 are provided there between for precise movement and control of the platens. Upper and lower platen disk brakes 56 and friction plates (not shown) are provided as means for locking the platens in select positions relative the thermoforming operations and for absorbing the stress of the loads associated with the thermoforming and compression functions of the apparatus.

Also associated with the press-like aspects of the platens are means to compress heat deformable sheets between the molds in order to thermally bond or cross-link the interfacing surfaces as will be described in more detail below. The conventional means for thermally fusing the upper sheet to the lower sheet are described in U.S. Pat. Nos. 3,925,140 and 3,868,209, and are incorporated herein by such reference. Alternate means for achieving the press-like functions of the thermal fusing process joining a combination of heat deformable sheets are also disclosed in U.S. Pat. No. 5,800, 846, which is also hereby incorporated by such reference. The means of '846 are an improvement over the means of '140 and '209. '846 uses an array of position-controlled hydraulic pistons, in place of the air bags that are inflated with compressed air in '140 and '209. Both means perform the incremental closing action compressing the sheets together in a forging-like manner. Both sets of apparatus in the present invented apparatus are operable to interlock the platens at relative positions with respect to the joining of the first combination of thermoplastic sheets and the second combination of thermoplastic sheet to facilitate the selective fusing of three sheets through the heat and compression of the present invention.

Other apparatus necessary for the triple sheet thermoforming machine 2 proposed in the preferred embodiments include computer console 64 shown in close proximity to a first PLC 66. The first PLC 66 receives, sends and returns process control input and output data used by the machine operator. A second PLC (not shown) controls switching gear controlling the radiant heat emitters of oven banks 26,28, 30,32 and 34 in an oven control cabinet 68. Additional PLCs are provided to control the motor driving the wheel and the operational functions of the load/unload, clamp frame, platen, shuttle system apparatus. (Also included, but not shown, are infrared sensors within the three ovens that operate to adjust oven temperatures in response to variation from normal conditions.) An inventory of rigidifying structures 72, for example, which can be placed within the thermoplastic articles that may be thermoformed by the apparatus, are also contemplated, and would be positioned adjacent the form station as will be described below. In this connection automated mechanical apparatus 74 acts to deliver structures 72 and other desirable insert objects to desired positions within the form station 10 in cooperation with the twin and triple sheet fusing procedures proposed in the production of thermoplastic articles according to the present invention.

Figure 2:
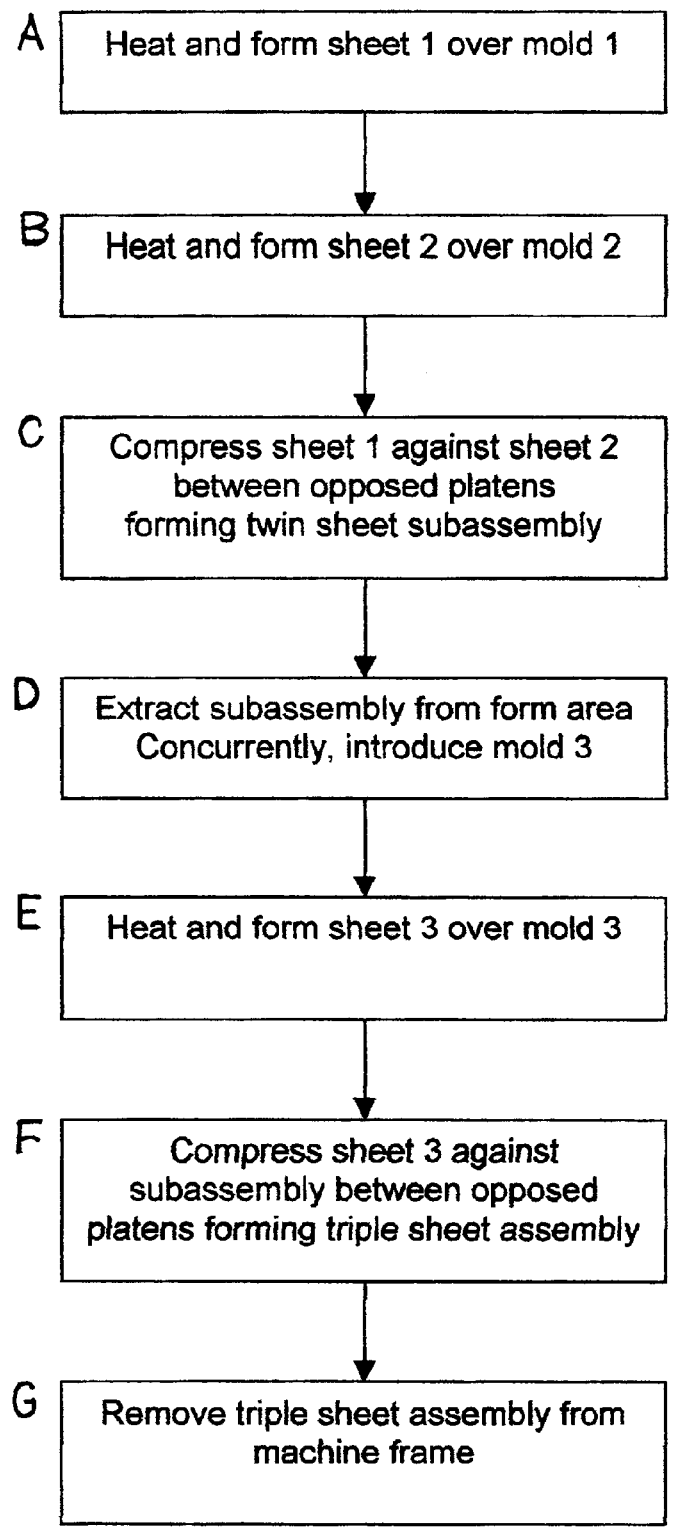
FIG. 2 is a block diagram showing the seven steps of the apparatus.

Turning now to the block diagram of FIG. 2 and the corresponding schematic side elevation view taken at the form station in FIGS. 3A–G, one process sequence of the apparatus of machine 2 is described for illustrative purposes. FIGS. 2A and 3A serve to demonstrate the molding of sheet 25b upon lower mold 42; the unclamping of sheet 25b from first frame 14; and, the retraction of lower platen 38 from sheet line 76 with sheet 25b under vacuum upon mold 42. (Mold 44 would be used as a plug assist in the formation of sheet 25b upon mold 42.) FIGS. 2B and 3B serve to demonstrate the molding of sheet 25a upon mold 44 located on upper platen 40; and, the retention of molded sheet 25a upon mold 44 in frame 16 at the sheet line 76. FIGS. 2C and 3C serve to demonstrate the upward extension of lower platen 38 with molded sheet 25b upon mold 42 into and against molded sheet 25a upon mold 44; the upward compression of lower platen 38 against upper platen 40 by movement of the bolster plate 59 caused by actuators 61; and, the selective fusing of portions of heated sheet 25a to selected portions of heated sheet 25b, thus completing the twin sheet formation and cross linking fusion of sheets 25a and 25b comprising the twin sheet sub-assembly. FIGS. 2D and 3D serve to demonstrate the ejection of sheet 25a from mold 44; the upward retraction of upper platen 40; the horizontal sliding action of second mold 46 into the vertically aligned position occupied earlier by mold 44; the further actions of the release of twin sheet sub-assembly 25a and 25b from second frame 16; and, the retraction, while molded sheet 25b is under vacuum upon mold 42, of lower platen 38 from sheet line 76. FIGS. 2E and 3E serve to demonstrate the molding of sheet 25c upon second mold 46 located upon upper platen 40; and, the retention of sheet 25c under vacuum upon mold 46 in third frame 18. FIGS. 2F and 3F serve to demonstrate the upward extension of lower platen 38, carrying twin sheet sub-assembly 25a and 25b upon lower mold 42 into contact with sheet 25c upon mold 46; the upward compression of lower platen 38 against upper platen 40 by movement of the bolster plate 59 caused by actuators 61; and, the selective fusing of portions of molded sheet 25a to selected portions of molded sheet 25c, thus completing the triple sheet formation and cross link fusion of sheets 25a, 25b and 25c into a unitary triple sheet article 200. Finally, FIGS. 2G and 3G serves to demonstrate the ejection of sheet 25c from upper mold 46 and sheet 25b from lower mold 42; the retraction of upper platen 40 and lower platen 38 from sheet line 76; the horizontal sliding action of mold 44 into the vertically aligned position occupied earlier by mold 46; and, the retention of sheet 25c in third frame 18, which is operable to carry the unitary triple sheet article to the load/unload station 4, which completes the triple sheet thermoforming operation.

Figure 3:
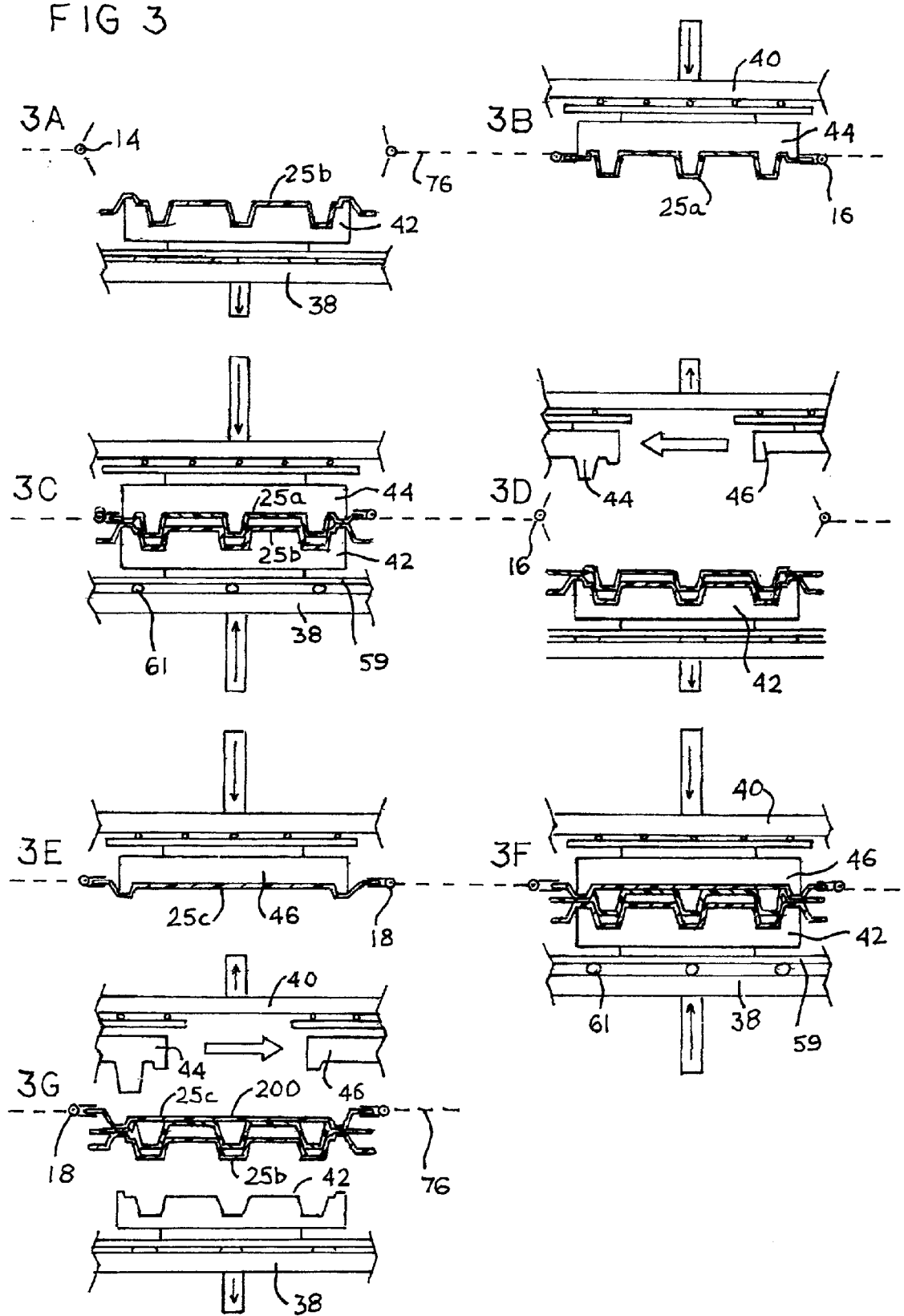
FIG. 3 is a schematic side elevation view showing the seven steps of FIG. 2 at the form station of the apparatus.

The triple sheet method sequence performed by the apparatus in FIGS. 2 and 3 is used to produce, for example, the unitary triple sheet articles shown in FIGS. 4 through 13. It is to be understood that the apparatus can manufacture a wide range of other end products for a variety of end market applications.

Figure 4:
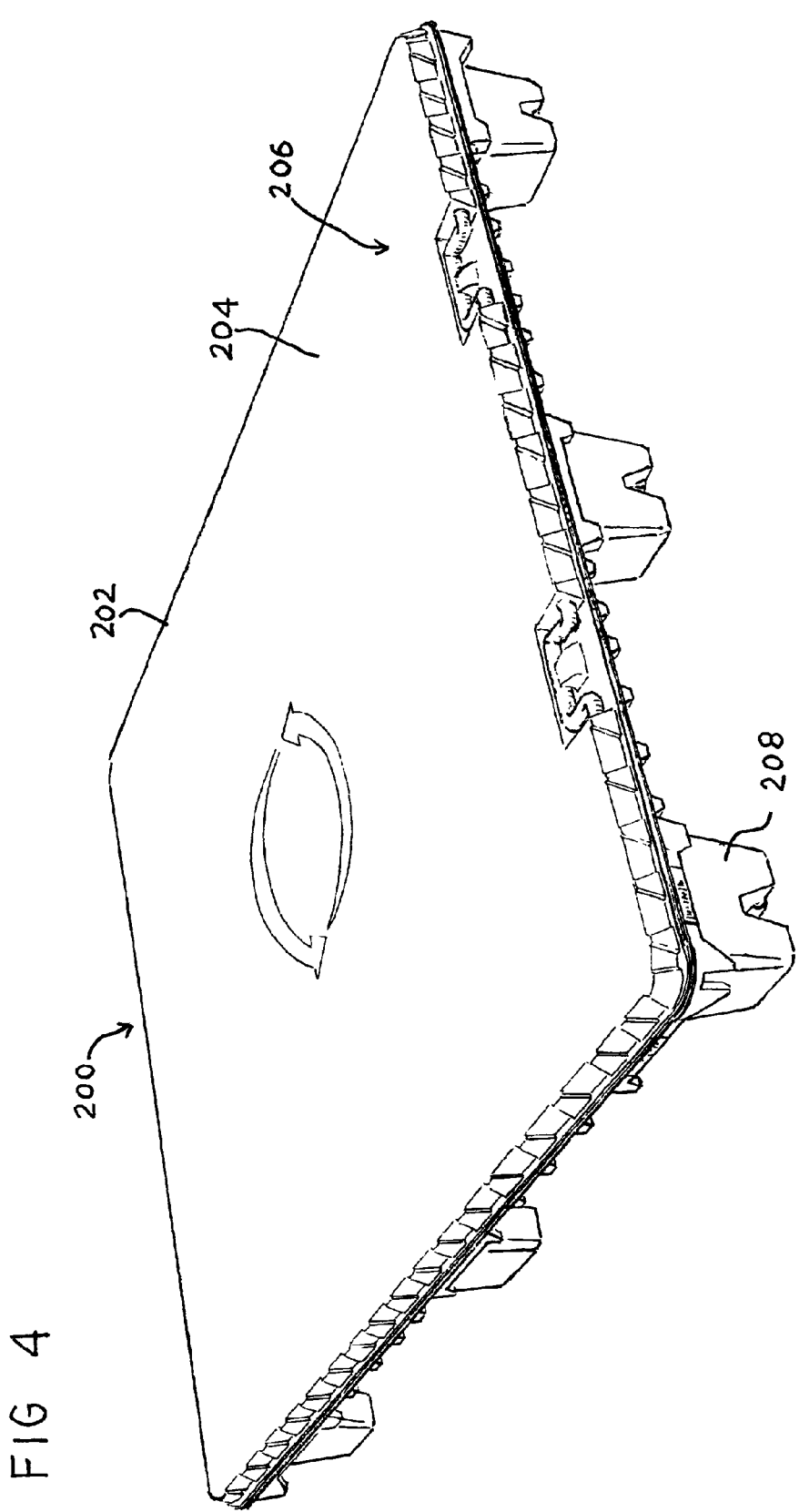
FIG. 4 is a perspective view of an exemplary triple sheet article.
Figure 5:
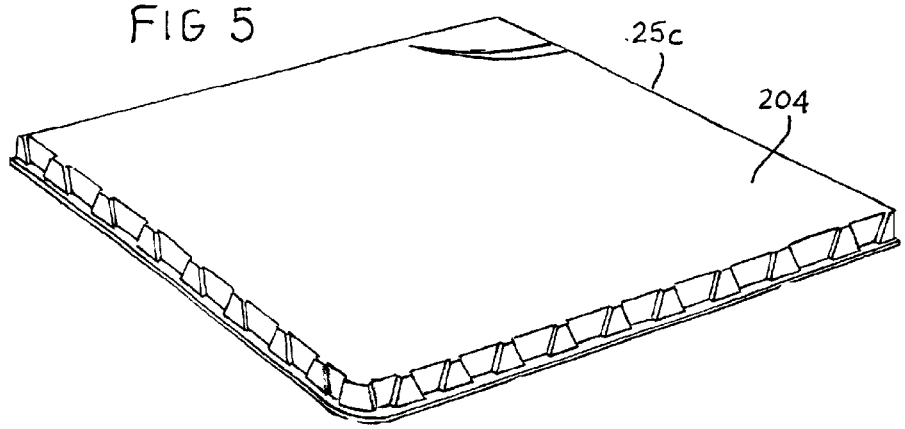
FIG. 5 is a sectional perspective view showing the top formed sheet of the triple sheet article shown in FIG. 4.
Figure 6:
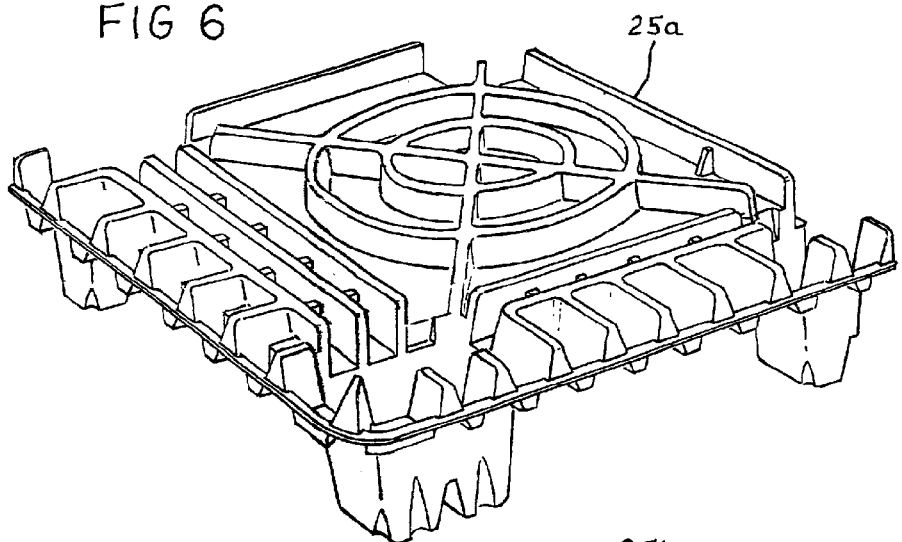
FIG. 6 is a sectional perspective view showing the middle formed sheet of the triple sheet article shown in FIG. 4.
Figure 7:
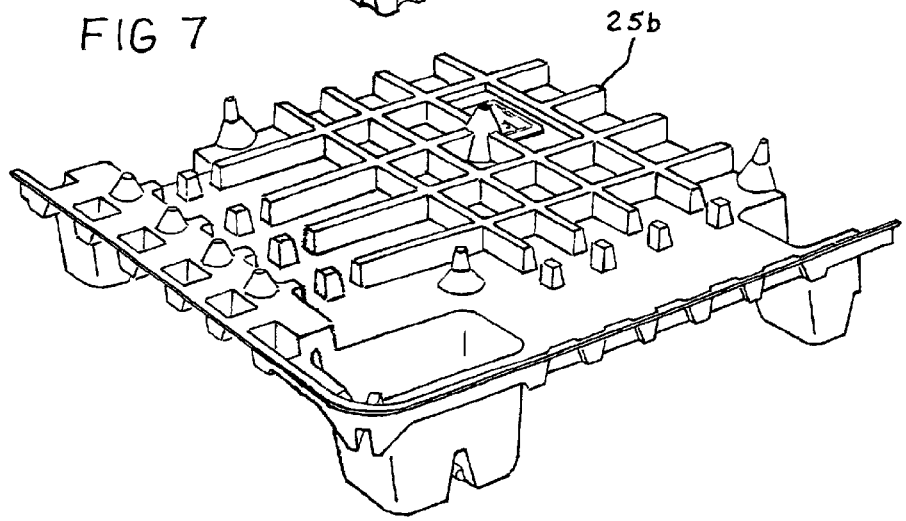
FIG. 7 is a sectional perspective view showing the bottom formed sheet of the triple sheet article shown in FIG. 4.
Figure 8:
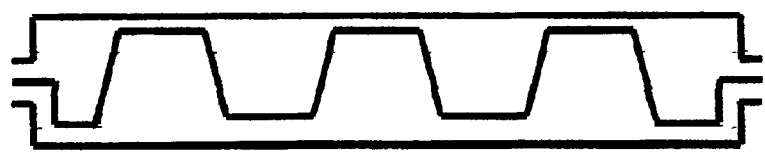
FIG. 8 is cross section of one experimental triple sheet article.
Figure 9:
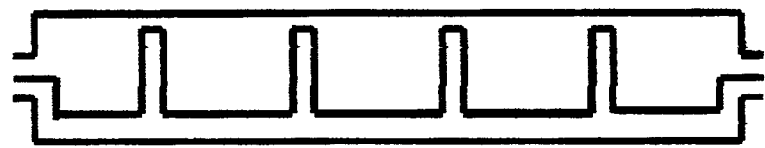
FIG. 9 is a cross section of a second experimental triple sheet article.

In the series of FIGS. 4, 5, 6 and 7 triple sheet article 200 is represented. Article 200 of FIG. 4 is a nine-leg pallet 202 and is comprised of sheets 25a, 25b and 25c, one quarter (1⁄4) sections of which are shown in FIGS. 5, 6 and 7. The triple sheet pallet 202 involves a substantially flat load supporting surface 204 formed by sheet 25c a triple walled load bearing surface 206, formed from sheets 25a, 25b and 25c, and double walled legs 208 for static load bearing strength. As may be appreciated by those skilled in the plastic pallet arts, the construction of pallet 202 shown in FIG. 4 would be considerably stronger than the prior art twin sheet construction suggested in U.S. Pat. No. 4,428,306. Further more, the triple sheet apparatus allows a pallet with both a flat deck and double walled legs to be instantly manufactured, which overcomes a number of problems associated with twin sheet pallets.

The dramatic increase in triple sheet pallet strength as measured against twin sheet pallet strength has been demonstrated and confirmed through experimentation, as will be described below. Three state of the art nine legged twin sheet pallets, each having a unique rigidifying methodology, which will be known by referring to U.S. Pat. Nos. 5,566, 624, 5,401,347 and 5,996,508, were reproduced using aluminum tooling in 1⁄4 scale (24×20-inch). High-density polyethylene (BA50100 or the equivalent HDPE) sheet with a starting gauge of 0.105 inches in cross section was procured and work pieces of each of the three representative twin sheet articles were produced. The three groups of work pieces each had a final over-all wall thickness of 0.210 inches and finished part weights of 3.5 lbs. Next the three aluminum twin sheet tool sets were reconfigured to simulate the three rigidifying methods in corresponding triple sheet construction. HDPE sheet with a starting gauge of 0.070 inches was procured and triple sheet samples from each reconfigured mold group were produced. The technique used to simulate a triple sheet machine was crude, but nonetheless effective. Two thermoforming machines were used. The rigidifying center sheet was thermoformed upon a first (single station) machine, and the resulting part was manually transported and placed between top and bottom sheets formed on a twin sheet machine in conventional manner before these top and bottom sheets were compressed together in a typical twin sheet phase. The resulting triple sheet work pieces each had a final over-all wall thickness of 0.210 inches and finished part weights of 3.5 lbs.

All six groups of work pieces were simply supported along the two 24 inch edges and a 4-inch diameter load with progressively increasing weights was applied upon the center of the work pieces. The resulting deflection simulating a racking load was measured on each group of work pieces at each incremental load. The averages of the raw data points of these test results are summarized below in Table 1.

TABLE 1

AVERAGE TEST DATA RESULTS -
Deflection measured in inches

|  | 0 LB. | 5 LB. | 10 LB. | 15 LB. | 20 LB. | 25 LB. | 30 LB. |
|---|---|---|---|---|---|---|---|
| 5,401,347 Twin Sheet | 0 | 0.0125 | 0.305 | 0.425 | 0.5875 | 0.9875 |  |
| 5,996,508 Twin Sheet | 0 | 0 | 0.0325 | 0.42 | 0.795 | 1.12 |  |
| 5,566,625 Twin Sheet | 0 | 0 | 0.0275 | 0.22 | 0.5075 | 0.825 |  |
| 5,401,347 Triple Sheet | 0 | 0 | 0.035 | 0.07 | 0.4825 | 0.7025 | 0.935 |
| 5,996,508 Triple Sheet | 0 | 0.0125 | 0.035 | 0.17 | 0.415 | 0.63 | 0.875 |
| 5,566,625 Triple Sheet | 0 | 0 | 0.03 | 0.375 | 0.79 | 1.22 |  |

Thus, a review of the data in Table 1 indicates the summary results shown in Table 2:

TABLE 2

Average Deflection Results at a 25 lb. Load in Inches

|  | Twin | Triple | Results |
|---|---|---|---|
| 5,401,347 | .9875" | .7025" | +29% |
| 5,996,508 | 1.12" | .63" | +44% |
| 5,566,625 | .825" | 1.22" | −48% |
| Average Deflection | .986" | .85" | +14% |
| Strongest Twin Sheet Vs Strongest Triple Sheet at 25 lbs. | .825" | .63" | +24% |

The experimentation conclusively demonstrated that triple sheet apparatus yields a significantly stronger structure than twin sheet apparatus. With respect to the loss of strength in the U.S. Pat. No. 5,566,625 triple sheet work pieces, one will appreciate by a review of the patent figures of '625 that the distribution of material in this arrangement is heavily concentrated along the lower plane of elevation. This is in stark contrast to the U.S. Pat. No. 5,996,508 arrangement wherein the material of the middle sheet is substantially evenly distributed between the upper and lower planes. These two relationships may be more fully appreciated by referring to FIG. 8, which characterizes '508and FIG. 9, which characterizes '625. Accordingly, it may be appreciated that more strength is generated when the triple sheet construction is more evenly distributed in the fashion of a honeycomb construction or a box frame design.

Figure 10:
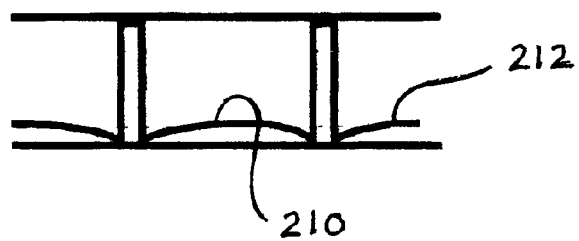
FIG. 10 is a partial cross section of the second experimental triple sheet article of FIG. 9.
Figure 11:
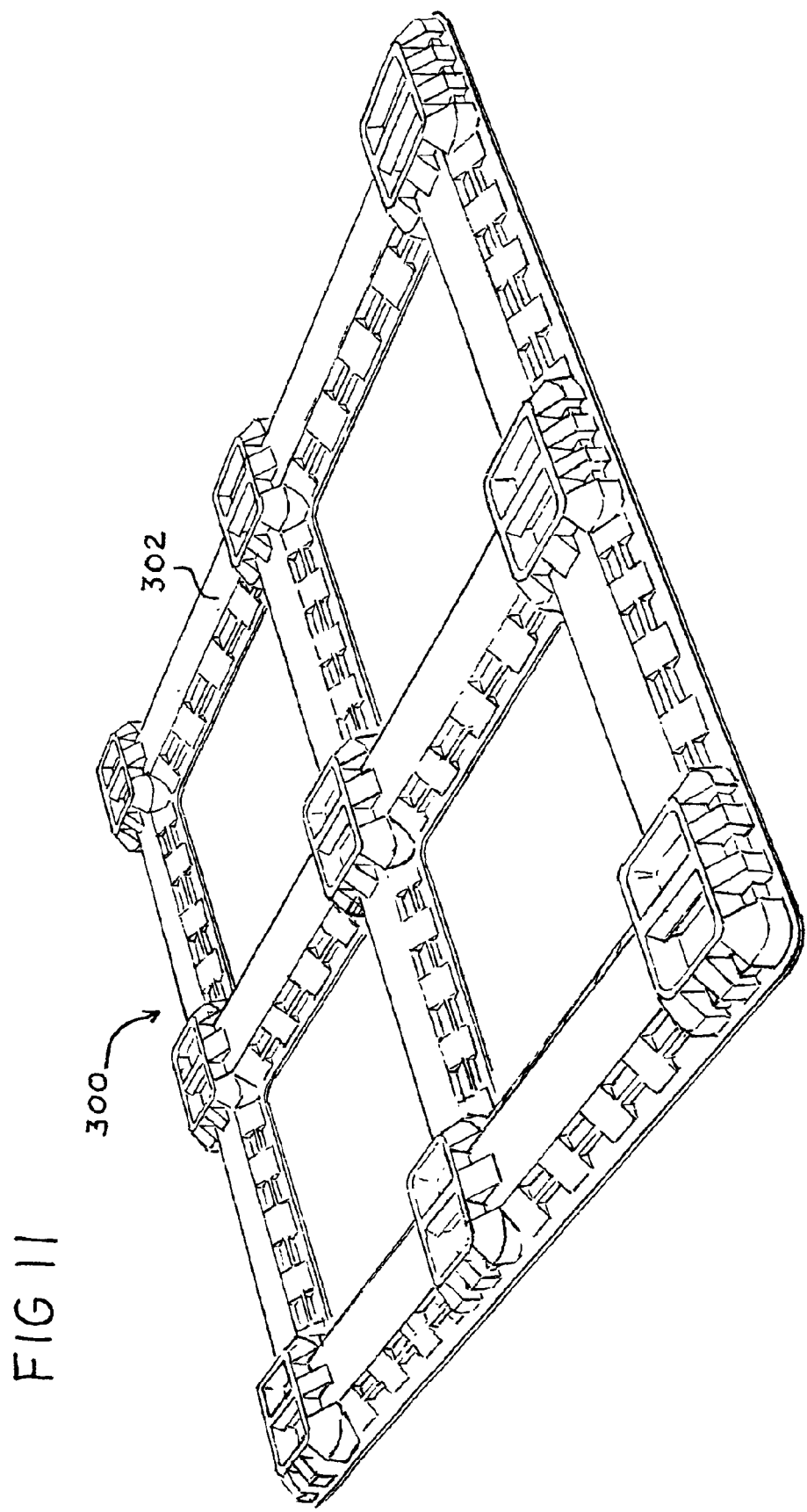
FIG. 11 is a perspective view showing yet another triple sheet article made by the apparatus.
Figure 12:
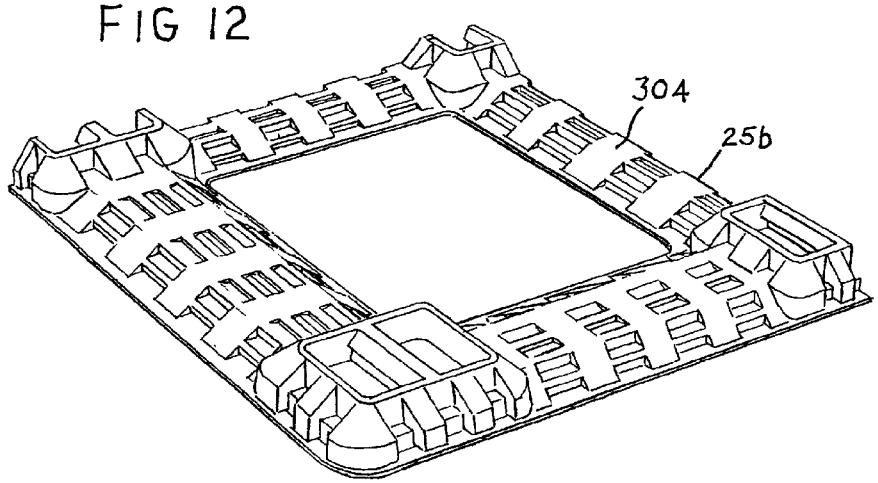
FIG. 12 is a sectional perspective view showing the top formed sheet of the triple sheet article shown in FIG. 11.
Figure 13:
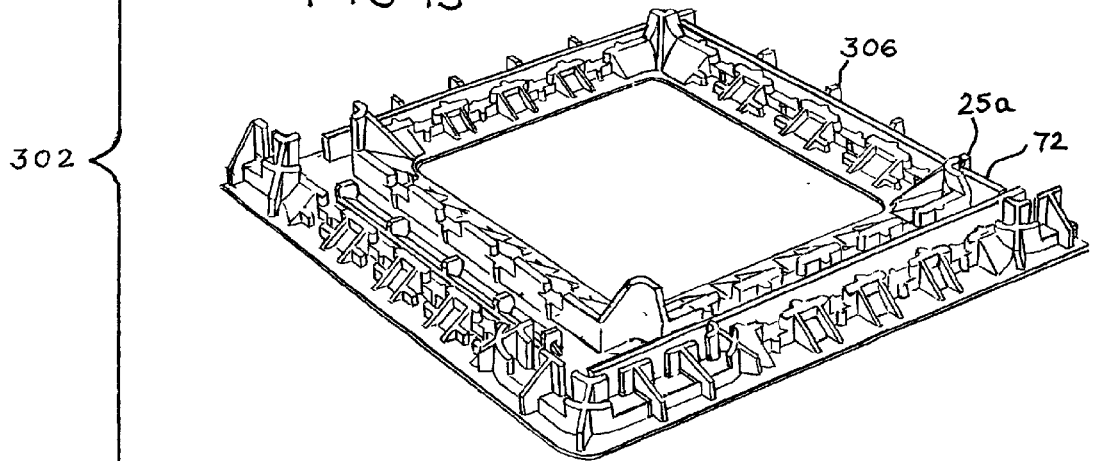
FIG. 13 is a sectional perspective view showing the middle formed sheet of the triple sheet article shown in FIG. 11.
Figure 14:
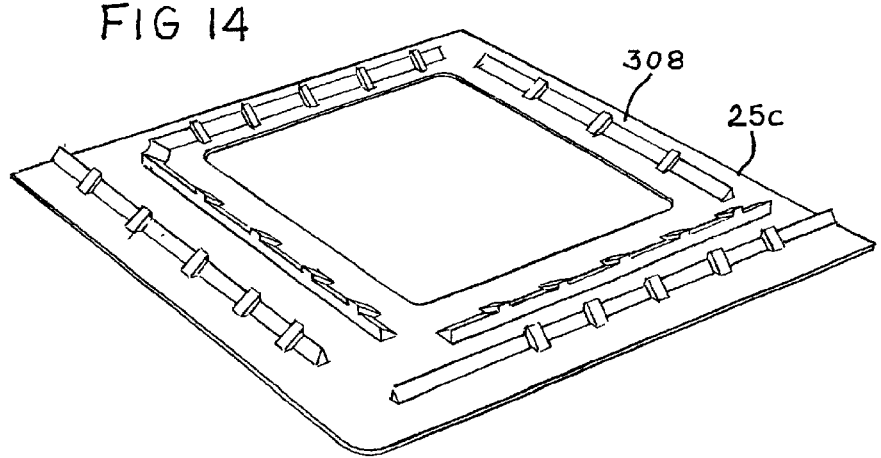
FIG. 14 is a sectional perspective view showing the bottom formed sheet of the triple sheet article shown in FIG. 11.

A second consideration was that the U.S. Pat. No. 5,566,625 triple sheet work pieces were much more difficult to simulate in triple sheet than either of the U.S. Pat. No. 5,401,347 or U.S. Pat. No. 5,996,508 approaches. In the simulation of '625 the surfaces of the lower plane 210 of the center sheet 212 fell below the hot tack adhesion temperature required for cross linking of the plastic material and the construction that resulted is more like that which is shown in FIG. 10. The end results were detrimental rather than beneficial. The experiment strongly suggests that the distribution of plastic is a critical factor contributing to strength.

In interpreting the results another factor must be considered. Not only was the simulation of the triple sheet apparatus crude, in that two machines were used in tandem, it should also be noted that the full design flexibility and complexity of triple sheet was not implemented in the work pieces. In particular, neither of the top or bottom sheets included any reinforcing structures because of the simulation's limitations. For example, load bearing strength would be dramatically increased by providing the structures of U.S. Pat. No. 5,996,508 in the middle sheet and the structures of U.S. Pat. No. 5,566,625 at a right angle to the '508 structures on the lower sheet, so that the structure of '625 could reinforce and deflect loads upon the '508structure. Therefore, although the test results showed a dramatic improvement in average strength in the order of 24 percent, with full implementation of the methodology and processing benefits of the invented apparatus, the improvement in load bearing strength would be considerably higher and therefore a important break through to overcome the significant shortcomings identified above.

Referring now to the series of FIGS. 11 through 14, it will be understood that the method sequence of FIGS. 2 and 3 of the triple sheet apparatus can also be applied to the manufacture of triple sheet article 300, which is known within the material handling industry as a load distributor 302. Load distributor 302 operates to distribute over a wider area the focused pressure transferred by the legs 208, such as is disclosed in reference to pallet deck 202, upon product stored in static condition. As seen in one quarter (¼) section views of FIGS. 12, 13 and 14, load distributor 302 includes an upper deck 304 formed from sheet 25b, a rigidizing structure 306 formed from sheet 25a and load distributing base 308 formed from sheet 25c.

As seen in FIG. 15, pallet 202 and load distributor 302 are combined in a snap together manner to provide a rackable pallet 400 comprising a total of six thermoplastic sheets. The Triple sheet articles offered by way of example, which are not intended as a limitation on the scope of the invention, should serve to demonstrate the unique and novel features, objects and advantages that the triple sheet thermoforming apparatus invented and described herein have to advance the art in the end market application to which the invention apparatus is applied.

Referring now to the apparatus in detail, the separate FIGS. 2 and 3 suggest the need for a third oven, such as first oven bank 26 above the load/unload station 4, to heat three successive sheets. In conventional twin sheet thermoforming apparatus, two oven stations are required to heat two successive thermoplastic sheets to an elevated temperature suitable for thermoforming. With the addition of a third thermoplastic sheet it is therefore necessary to add extra heat capacity to facilitate the triple sheet heating process contemplated in the present apparatus.

As is generally known in the art of thermoforming high density polyethylene (HDPE), the rule of thumb understanding is that +/−0.75 seconds of radiant heat for each 1/100 inch of material thickness is required to elevate the thermoplastic sheet to a suitable thermoforming state. Therefore, if the starting gauge of the thermoplastic sheet is 0.125 inches thick in cross section, a heating duration of +/−94 seconds within an oven having 30 watts per square inch (wsi) at +/−50% average power output would be required. According to the twin sheet methodology, the +/−94 seconds of heat required to heat a sheet of HDPE would be applied to each sheet over a total duration split between the two oven stations. In this manner, the approximate duration of time the two successive sheets would reside within each oven is +/−47 seconds, although the duration of time the first sheet spends in the first oven is usually less than the time spent in the second over, from a forming function stand point. It is also understood in the twin sheeting art that the formation of a first thermoplastic sheet over a first thermoforming mold is closely followed by the formation of a second thermoplastic sheet over a second thermoforming mold, which in turn is closely followed by the subsequent fusing of the two formed sheets while the first and second formed sheets remain at relatively high temperatures for the thermal bonding and selective fusing of the twin sheet methodology. Accordingly, it may be now understood that in the twin sheet process the heating period is timed to equal the combination of forming periods, fusing periods and cooling periods, which progress in known manner, such that the forming, fusing and cooling periods are substantially equal in length to the heating periods of the subsequent pair of thermoplastic sheets being heated in the two oven stations for the next twin sheet forming cycle. Although a +/−47 second heat duration in each oven is suggested, the duration of time each sheet spends in each oven may be longer or shorter, but nevertheless, +/−94 seconds overall. Further, compensation for sheets of different thickness in cross section is provided by constant heater output control at the two ovens of the twin sheet apparatus.

In the current thermoforming art it is standard to regulate the amount of energy emitted by the heaters of the ovens of the twin sheet apparatus according to percentage timers or the like with the use of power switching devices such as solid state relays or silicon controlled rectifiers. Also, an oven may be separated into two or more zones so that each zone can be independently regulated relative several known factors. By way of example, heater output zones within the oven corresponding to the outer margins of the sheet may be regulated to emit energy in the form of radiant heat energy for six of every ten seconds (i.e. 60% output), while the zones corresponding to the center areas of the sheet may be regulated to emit energy in the form of radiant heat energy four of every ten seconds. Thus in the current art oven zones are regulated independently and in substantially constant ten or eight +/−second intervals in phase with the single or twin sheet thermoforming methodology. Oven output is therefor substantially constant in the twin sheet operation, and after warm-up calibrations is only adjusted in response to external variations.

In the triple sheet apparatus, however, the amount of radiant energy applied to each sheet will vary according to the duration of time each sheet spends in each oven. It is also understood that the first oven 26, with only a single upper bank of infrared heating emitters 36, would have to be controlled to increase its heat energy output for sheet 3 relative to sheet 1 of the ongoing triple sheet operation for two reasons. First, sheet 3 resides in oven 1 for 31 percent of it total heat duration. Second, oven 1 normally produces 15+wsi versus 30+wsi for ovens 2 and 3, with two oven banks each. Therefore, rapid response infrared emitters are preferred in first upper oven 26. A processing algorithm is used to adjust the heater output of this first oven bank, and preferably all five oven banks, in order to match heater output to the heat absorption characteristics of the three sheets to be thermoformed by the apparatus. Therefore, heater output in the triple sheet apparatus is further regulated by controllers relative to the duration of time that each of the three successive sheets dwells in the three ovens. Means of oven control and processing algorithms are required objects for the triple sheet apparatus.

FIG. 16 comprises Chart 1 simulating the operational steps of the apparatus, starting from the first sheet charged into the machine to the tenth sheet charged into the machine. By the time Cycle 4 80 is reached the machine is fully charged and the respective cycle times of the apparatus are set in substantially constant motion. By way of further explanation, the four stations and their operating functions are identified in the column headings. The introduction and movement of the successive sheets through the four stations are identified in the row headings. Within the column and row cells are the time factors in seconds for each such operating function. Therefore, in CYCLE 1, sheet 1 is loaded into frame 14, which takes up to 11 seconds, and sheet 1 is heated for 9 seconds in oven 1. In CYCLE 2 the wheel indexes forward by a ¼ turn in 5 seconds to move sheet 1 to oven 2, where it dwells for a period of 20.5 seconds. Meanwhile, sheet 2 is loaded into frame 16, where after sheet 2 dwells in oven 1 for 10.5 seconds. In CYCLE 3, sheet 1 is indexed forward into oven 3 for a dwell period of 29.5 seconds, sheet 2 is indexed forward from oven 1 to oven 2 for a dwell period of 29.5 seconds, and sheet 3 is loaded into frame 18, where after sheet 3 dwells in oven 1 for 18.5 seconds. In CYCLE 4 the wheel indexes forward and heated sheet 1 enters the form station where the lower platen extends upward in 3.5 seconds to vacuum form sheet 1 in 1.5 seconds, where after the platen dwells in this position for 10 seconds before frame 14 releases sheet 1 in 1.5 seconds and the lower platen retracts to an open position in 3.5 seconds. Concurrently, sheet 2 has moved to oven 3 for 20 seconds, sheet 3 moves to oven 2 for 20 seconds, and sheet 4 is loaded into frame 20 where after sheet 4 dwells in oven 1 for 9 seconds. In CYCLE 5, sheet 2 is indexed into the form station where the upper platen extends downward in 3.5 seconds to vacuum form the second sheet in 2 seconds, where after the lower platen extends up to close the sheet 1 against sheet 2 in 2 seconds, and the pressure form compression function occurs for 5 seconds, followed by a 10 second dwell period. Finally, frame 16 opens in 1.5 seconds, and the platens retract, with the twin sheet subassembly being carried away from the sheet liner by the lower platen. Concurrently, sheets 3 and 4 are indexed forward into the next ovens and frame 14 is charged with sheet 5, which dwells in oven 1 for 16.5 seconds. During the final stages of CYCLE 5 the upper platen retracts into position where a first mold is replaced by a second mold by means of the mold shuttle system during a 16.5 second period that overlaps CYCLES 5 and 6. In CYCLE 6 sheet 3 enters the form station and the upper platens extends downward in 3.5 seconds to vacuum form sheet 3 is 2 seconds, where after the lower platen extends up in 2 seconds to close the twin sheet subassembly against sheet 3, where after the pressure form compression phase is repeated for 5 seconds followed by 10 seconds of closed dwell time. The platens then retract while frame 18 remains closed. Concurrently, sheets 4 and are indexed to the next ovens and sheet 6 is loaded into frame 16. In CYCLE 7, the triple sheet article is indexed forward from the form station and is unloaded from the machine in 6 seconds. Sheet 7 is loaded into frame 18, remaining in the oven 1 for 3 seconds and sheets 6 and 5 are indexed forward into the next ovens, and the fourth sheet enters the form station where the sequence of CYCLE 4 is duplicated in CYCLE 7, and operating functions continue thereafter in phase in the manner suggested.

Figure 18:
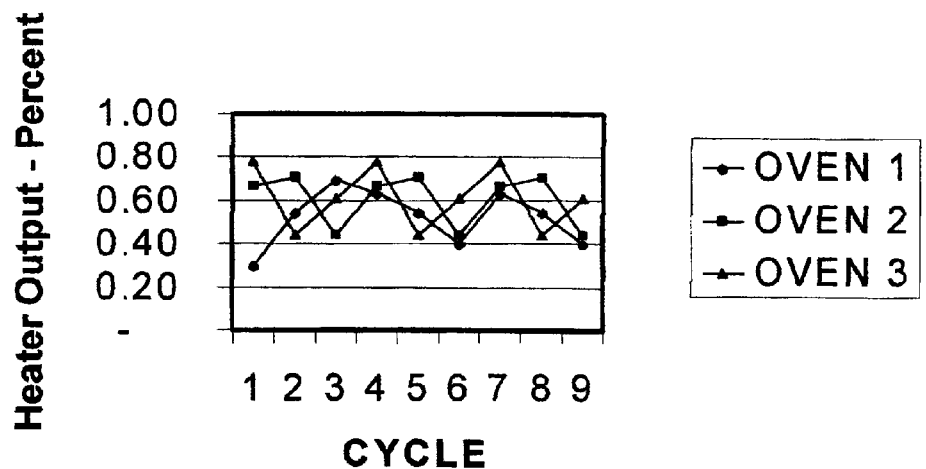
FIG. 18 contains Chart 5, which characterizes the controllable heater output of the invented apparatus relative the operation shown in FIG. 16.
Figure 19:
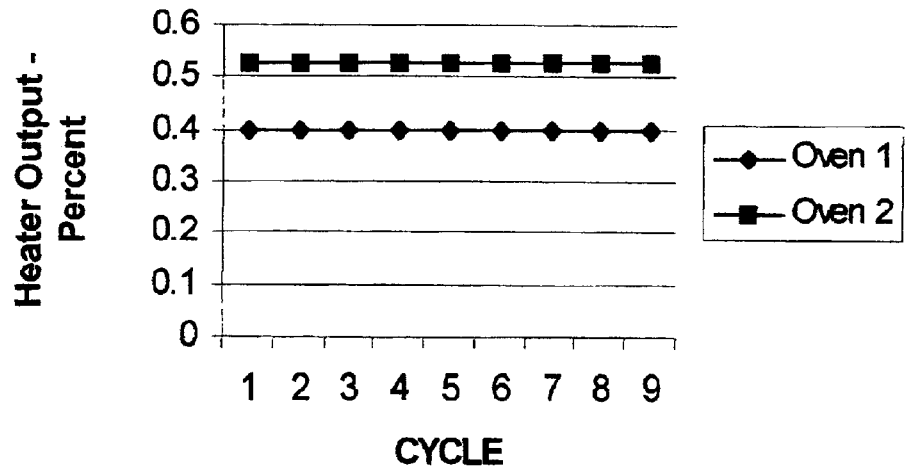
FIG. 19 contains Chart 6, which characterizes the constant heater output of the prior art.

Therefore, wit respect to oven heater output and the time each sheet dwells within each oven, it will be seen in summary Charts 2, 3 and 4 of FIG. 17 that once CYCLE 7 is reached, the apparatus process sequence becomes stabilized and is repeated in continuous phase. Chart 2 summarizes the length of time each sheet spends in each oven. Chart 3 summarizes the amount of heat each sheet receives from each oven. Chart 3 shows the calculation of the level of heater output required at each oven to heat the three sheets to uniform temperatures for proper thermoforming. Therefore, for illustrative purposes, the heater output profile of the ovens from cycle to cycle could be characterized in Chart 5 of FIG. 18. This is quite different from the heater output profile of the prior art twin sheet apparatus as suggested in Chart 6 in FIG. 19.

It will now be appreciated that heater output control is essential for the operation of the invented apparatus. It is equally important that the infrared emitters are equal to the task as will be described below. Heat can be transferred to sheet in three ways, namely conduction, convection or radiation. Infrared heat is one form of radiation that happens to best match the absorption characteristics of most thermoplastics, including the preferred HDPE. There are many options for radiating infrared heat. Some of the most common of these are electric heaters comprising calrods™, ceramic elements, panel heaters and quartz tubes. Quartz tubes are the industry standard when fast response is required. Quartz tube heaters can be quickly adjusted to match the requirements of different sheet thickness and oven duration times (i.e. the time a sheet dwells in an oven). Electric heaters used in the triple sheet thermoforming operations should provide at least watts per square inch (wsi) on each of the top and bottom oven banks, for a minimum machine total of 75 wsi. To facilitate more responsive and zoned heating, ceramic elements can be spaced to provide 30 wsi, or quartz tubes with a maximum 60 wsi can be used for each of the 5 oven banks, for a total of 300 wsi. Accordingly, it is an objective of the present invention to provide 3 top and 2 bottom heat sources having a minimum density of 15 wsi, and PLC controlled dosed loop control systems facilitating multivariate oven zone and heater profile control from cycle to cycle as suggested in FIG. 18.

Another object of the invention are controls suitable for emitting higher or lower heat profiles from one frame carrying thicker sheet to a next frame carrying thinner sheet Triple sheet thermoforming apparatus features rapid response heaters and heater control so that the triple sheet article to be thermoformed according to the triple sheet methodology can be constructed out of thermoplastic sheets comprising different fillers and thickness in cross section and in other combinations which optimize the strength to weight to cost ratios of the article being constructed. For example, in the case of article 200, top sheet 25c can be thinner in cross section than sheets 25a or 25b, for a variety beneficial results.

Now moving on to the clamp frames, it will be appreciated after reviewing the operational functions of the apparatus described in connection with FIG. 16 that programmable logic controls are required for proper operation of the clamp frames. Such precise control is not required in twin sheet apparatus. In twin sheet apparatus the first and third or second and fourth frames are simply controlled, such as by frame mounted limit switches and the like, to remain closed to carry the twin sheet article from the form station to the load/unload station at the end of the twin sheet cycle. In other words, the twin sheet frame cycle is open/close/open close at the form station. In the example of FIG. 16 first frame 14 is controlled to open for the first eleven cycles and only then remain closed to carry an article to the load/unload station in the twelfth cycle.

Another aspect of the clamp frames is that practitioners may find it advantageous to utilize a method sequence requiring the first sheet to be formed upon a mold associated with the top platen. Conventional twin sheet frame apparatus will not accommodate extraction of the formed sheet above the sheet line, as the pin bars are pivotally mounted to a fixed clamp frame section. For maximum flexibility the triple sheet clamp frame apparatus comprises co-engaging, pivotally opposed pin bars mounted to co-acting solenoid operated cylinders that open from the top and the bottom. Twin sheet clamp frames typically open from the bottom. Although the invented apparatus can be practiced in the mode suggested in FIG. 3 with conventional twin sheet pin bar arrangements, pivotally opposed pin bars would be required to practice all of the modes contemplated in the present apparatus.

Another aspect involving the frames is the manner in which they are controlled in the "run-off" area of the sheet. As is well understood in the twin sheet methodology, the single action solenoid operated cylinders open from the bottom after the first sheet is molded and remain closed after the second sheet is molded, so that the clamp frame can carry the twin sheet article to the load/unload station. This open/close/open/close sequence is repeated in phase in the prior art twin sheet methodology, and as mentioned, requires relatively simple process control. The triple sheet methodology is substantially more complicated. The first and third mold of the method sequence of FIG. 3 must stroke though the sheet line a distance that accommodates the path traveled by the opening pin bars. The second mold in the method sequence only forms a seal to minimize the need for stroke through. This arrangement will be better understood by referring to FIG. 3G in particular, which shows the relative stroke through relationships of the three sheets of the article 200.

Turning now to the triple sheet platen control apparatus, it will be understood, particularly in light of the aspect of pin bar travel, that the platens travel from and to a plurality to different open and closed positions during each cycle of the apparatus. This is in contrast to twin sheet apparatus wherein the lower platen has an open position and two closed positions, the first closed position relative thermoforming the first sheet and the second closed position relative the compression phase, while the upper platen has one open position and one closed position, the close position concurrently relative thermoforming the second sheet and the compression phase.

In triple sheet apparatus, the lower platen has at least one open position, and at least three closed positions relative thermoforming one sheet of plastic and two compression phases. The upper platen has at least two open positions, with one relative the actuation of the mold shuttle system and one relative withdrawal from the sheet line. The upper platen has at least two closed positions relative a first thermoforming and compression phase and a second relative a second thermoforming and compression phase. A third closed position may also be introduced as an assist function cooperating with the thermoforming of a sheet associated with the lower platen (the technique is known as "plug assist"). Therefore, according to this requirement, a more complex system of precise controls is provided for triple sheet apparatus. The system of controls includes the addition of machine operator platen control functions and settings at the computer console 64 and increased code at the PLCs for additional control circuits to expand the functionality and respective open and close instructions phased with the precise operation of the platen apparatus.

Further more, in order to facilitate the two compression phases contemplated in the operation of the apparatus, some additional intervention is required, which intervention is dependent upon the type of platen systems are deployed in the apparatus. In the one type of apparatus set forth in U.S. Pat. No. 3,925,140, the platens are interlocked for the compression phase by means of four rotating vertical locking shafts and lugs associated with the upper platen and lug-receiving heads adjustably mounted to threaded rods associated with the lower platen. In twin sheet apparatus, where only one compression phase is contemplated, the lug receiving heads are manually adjusted to provide for the proper receipt of the lugs in the key-hole openings of the heads. This manual adjustment and calibration is typically a one-time set-up function. In order to facilitate the two compression phases of the triple sheet apparatus, wherein the relative closed positions of the opposed platens are different for the two compression phases, it would be necessary to actuate either the locking shaft of the upper platen or the threaded rod and receiving head of the lower platen. This intervention requires additional equipment and precise control systems for in-cycle actuation.

In a second type of apparatus, as set forth in U.S. Pat. No. 5,800,846, the selectable positions of the platens are facilitated by actuation of controllable motors and observed by linear variable displacement transducers vertically positioned adjacent the platens. When the platens are closed for the compression phase the upper and lower platens are locked in place by disk brakes and/or friction plates. Thus, it will be appreciated that the apparatus of '846 is more amenable, when additional PLC control circuit means are provided, to facilitate the two compression phases contemplated in the triple sheet apparatus, than the alternate '140 apparatus.

It should also be understood that other means of platen control facilitating the two compression phases contemplated in the present apparatus are available, as would be known by referring to the associated platen control arts practiced and preferred in the numerous other plastic molding arts, such as injection and resin transfer molding apparatus, and the like. Furthermore, the hydraulic array mold support suggested in '846 may be combined with the platen locking apparatus of '140, and conversely, the pneumatically inflated air bags of '140 can be combined with the platen locking apparatus of '846 to achieve the object of facilitating two relative closed platen positions for the two compression phases of the triple sheet apparatus.

Figure 20:
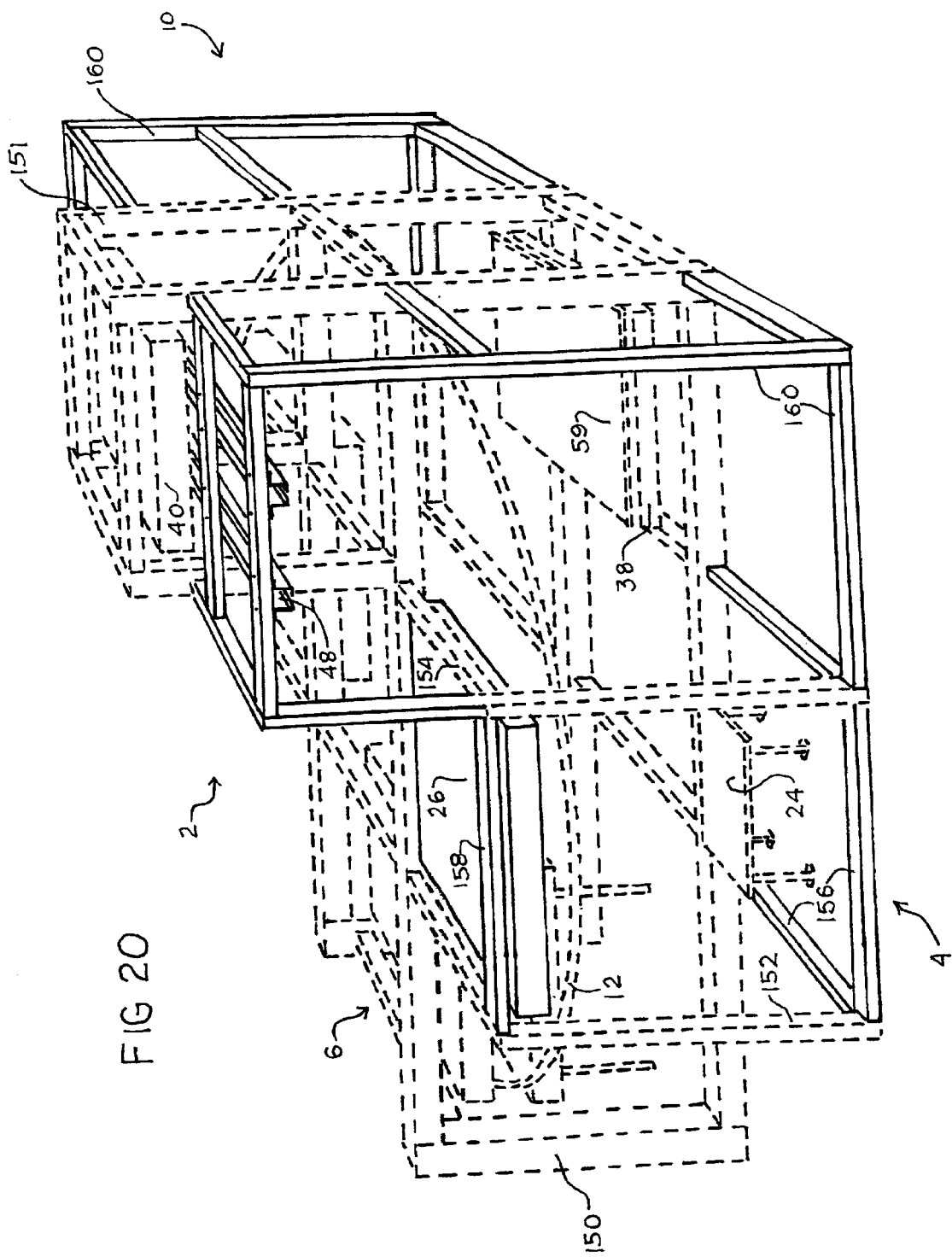
FIG. 20 is a perspective view identifying the prior art apparatus in phantom and the invented apparatus is full line detail.

Now moving onto the superstructure of the machine frame of the invented apparatus, it will be helpful to refer to FIG. 20. As seen in FIG. 20, a conventional twin sheet machine frame 150 and apparatus are shown in phantom. The machine frame components and apparatus particular to triple sheet apparatus is drawn in full line detail.

The triple sheet apparatus machine frame structures at the load/unload station 4 involve the floor members 156 about the base of the superstructure 150 and the cross member 158. The members 156 and 158 are operable with elements 152 and 154 of superstructure 150 to carry the load of oven 26 in a position vertically aligned in spaced parallel relation above fully indexed clamp frames (not shown) supported upon wheel 12.

In the regions of the form station 10 are a plurality of structural members 160 generally extending to the left and right of columnar elements 151 defining the form station 10. The structural members 160 are adapted to support the combined loads of the laterally movable mold shuttle system 48 and the thermoforming molds (not shown) attached thereto. As will be described below in more detail, mold shuttle system 48 operates to shift a first mold 44 laterally into position into the form station 10 to be engaged by the vertically movable platen 40 to thermoform a sheet of thermoplastic over said mold 44, and then to shift a second mold 46 laterally into position in the form station 10 to be engaged by the vertically movable platen 40 to thermoform a successive sheet of thermoplastic over second mold 46. Thus, mold shuttle system 48 reciprocates two molds back and forth into and out of the form station 10 in phase with the triple sheet thermoforming methodology.

It is also understood that several variations of the apparatus relating to the mold shuttle system 48 exist. For example, in place of one mold there may be equipment to provide a pressure forming function, as described in co-pending Provisional Application Serial No. 60/241,668, filed Otc. 20, 2000, which is incorporated herein by such reference. A plug assist function, as would be understood and anticipated by referring to application Ser. No. '668 could also be used, in which case plug assist tooling would replace one of the contemplated molds 44 or 46.

It should also be understood that a mold shuttle system 48 in another embodiment of the invention may be contained entirely within the vertical margin defined by the borders of a vertically moveable platen, such that approximately ⅓ or less of the platen would be developed to thermoform a triple sheet article. In such cases, structural members 160 adjacent to the right and left of the form station 10 would not be contemplated as part of the triple sheet apparatus. It is also known that thermoforming machines come in many sizes. As may be seen in FIGS. 21A and 21B, machine platens characteristic of the heavy gauge sector of the thermoforming industry range up to 180 inches in width (transverse direction of sheet extrusion) and 360 inches in length (extrusion direction). Accordingly, it may be understood that laterally moving slide structures 49 can be arranged to slide successive molds contemplated in the triple sheet methodology in the transverse (see 21A) or extrusion (see 21B) directions upon a platen. It may also be understood that if the platen is sufficiently large, two or more articles, such as polymeric dumpster lids or fuel tanks, may be thermoformed simultaneously with co-acting shuttle systems 48a and 48b. As may be appreciated in reference to FIG. 21A, wherein the production of long articles, such as a kayak is proposed, the limiting factor in the size of a product that can be made according to the present embodiment of triple sheet thermoforming apparatus is determined by the size of the machine platen 40.

In the preferred embodiment of the apparatus it is advantageous to attach upon the conventional superstructure 151 enclosing the form station column and beam structures 160 suspending outer elements of the mold shuttle system 48 operable with inner elements of the mold shuttle system to facilitate the lateral shifting of two molds into or away from mold engaging means 185 mounted upon a vertically movable platen 40. In this arrangement the full area of the platen 40 may be developed for supporting the mold(s) used in the apparatus.

In further elaboration of the mold slide system 48 and its basic constituent parts, it will be understood in conjunction with FIGS. 22A and 22B, that the mold shuttle system 48 is characterized by three zones including zone 170 occupying a position between the load/unload station 4 and the form station 10, zone 172 occupying a position between the third oven station 8 and the form station 10, and zone 174 co-existing with the upper platen 40 within the form station 10. Zones 170 and 172 are supported by the machine frame elements 160 that are attached to superstructure 151. Within zones 170, 172 and 174 is track 179, or the equivalent, comprising track sections 180, 178 and 176, respectively. Track section 176 is attached to the upper platen 40, which platen travels vertically from open to closed positions. Mounted upon the track 179 are two moving platforms 182 and 184, upon which molds 46 and 44, or alternate tooling are affixed, respectively. The platforms 182 and 184 selectively travel laterally into and out of the form station 10 by controlled actuation of the shuttle system. Upon entry into zone 174 a platform is mechanically engaged by rigid clamping means 185 mounted upon the platen for movement of the platen from open positions to closed positions. It may also understood that although the shuttle system 48 and frame elements 160 are orientated in a side-to-side direction, the shuttle system could be rotated 90 degrees in a front-to-back direction in relation to the platen as preferred by the practitioner or the machine builder of the apparatus.

Accordingly, it will be appreciated that in synchronization with the triple sheet methodology mold slide system 48 is operable to move platform 182 and mold 46 into form station 10 to be releaseably engaged by traveling platen 40 to thermoform a first sheet and to replace platform 182 with platform 184 and mold 44 into the form station 10 to be releasably engaged by traveling platen 40 to thermoform a second sheet. The reciprocating action performed by mold shuttle system 48 may be provided by precise controllable means including hydraulic, pneumatic or electromechanical actuation, or combinations thereof, as known in the actuation arts or as may be preferred by the practitioner of the triple sheet methodology or the machine builder of the triple sheet apparatus. Furthermore, although a reciprocating shuttle system 48 is suggested, the molds 44 and 46 could be independently pushed into and pulled from the platen engagement position 177 from zones 172 and 170 along track like apparatus 179 by controllable ram means 181, as suggested in FIG. 23. Accordingly, it is to be understood that a mold shuttle system delivering two molds to the form station from relative movement therefrom for thermoforming two sheets can be accomplished by various means, and all such means fall within the scope of the invented triple sheet thermoforming apparatus.

Referring finally to FIG. 24, a plan view of an automated work cell 250 comprising the invented apparatus and auxiliary equipment is shown. In order to facilitate the loading and unloading function according to CYCLE 7 252 of FIG. 16, an automated sheet delivery system 254 is provided. As suggested in reference to article 200, two types of plastic sheet 25*i* and 25*ii* are used. The sheet delivery carriage 256 selects the desired sheet to be charged into the apparatus. The successive sheets of plastic are then conveyed through three controllable ovens 258, 260 and 262 in the desired order. The heated sheets enter the form station 10 where they are thermoformed in the desired sequence between the opposed platens 40 and 38. As suggested in reference to article 300, after the first sheet is thermoformed and extracted from the sheet line by movement of platen 38, rigidifying structures 72 are introduced by means of apparatus 74 positioned externally and adjacent the form station. The apparatus 74 comprises a delivery shuttle 264 that traverses from the a position intermediate the platen to a position 266 relative a subassembly track system 268 comprising a three segment track 270 supporting the structures 72*i* and 72*ii* that are to be sequentially encapsulated between the three sheets forming the unitary article. The delivery shuttle is actuated to travel upon a shuttle track 272 for relative movement. Associated with the upper platen is a mold shuttle system 48, which is operable to position two-up mold groups 44*i*/44*ii* and 46*i*/46*ii* into position upon the platen for movement to positions relative thermoforming and compression phases thereafter. After the first sheet is thermoformed the second and third sheets are thermoformed and compressed together in the manners suggested in connection with FIG. 3. Once all three sheets have thermoformed and compressed together to form the pair of triple sheet articles, the wheel is indexed forward to deliver the articles from the form station to the load/unload station, where at the articles are discharged from the machine to a track system 274 that conveys the articles to a cooling station 276, where the articles dwell for a cooling period. Thereafter, the articles are conveyed into a CNC trim station 278 where the finished articles are finally trimmed into individual units from the sheets thermoformed in a unitary sub-assembly by the apparatus. Therefore, one will immediately understand that the apparatus of the present invention can be deployed in combination with auxiliary equipment and apparatus to provide fully automated work cells in which the only labor contemplated is associated with charging the auxiliary apparatus with raw materials, article inserts and removing the recyclable by-product from the CNC trim station.

Thus it maybe seen that the triple sheet apparatus, together with the microprocessor programmable and menu-driven control capabilities, offers a wider degree of flexibility in process functionality and adaptability. Heat control of the triple sheet apparatus will be in accordance with algorithms that adjust heat profiles within the five ovens in response to sensor inputs concerning air temperature, component temperatures and the sagging catenary disposition of the successive thermoplastic sheets engaged in the clamp frame apparatus of the invention. The heat control algorithms may be over-ridden by manual adjustment by a skilled operator as required, or again, preferably controlled by adaptive algorithms that increase or decrease heater output in accordance with the forming, fusing and cooling sequences and dwell times of the preferred triple sheet apparatus. Precise apparatus controls with respect to the sequential operation of the platens, the forging-like actuation of the compression phases and the sequential control of the mold shuttle systems are provided to facilitate automated functionality of the invented form station apparatus. The object of thermoforming triple sheet articles by simultaneously heating three successive sheets in three controllable ovens, thermoforming the three heat deformable sheets over three shape giving molds, and then compressing and instantly fusing the three shaped sheets together between selectively controlled opposing platens is achieved and provided in the invented apparatus.

It is to be understood that the drawings and descriptive matter are in all cases to be interpreted as merely illustrative of the principles, methods and apparatus of the invention. The examples and descriptions provided are not meant to be limiting the same in any way, since it is contemplated that various changes may be made in various elements to achieve like results without departing from the spirit of the invention or the scope of the appended claims.

I claim:

1. Apparatus for differential pressure forming a single article from three heat deformable thermoplastic sheets comprising:
   four work stations designated one, two, three and four positioned in spaced relation in a circular arrangement,
   a frame supporting said work stations,
   said work stations one, two and three including an oven for heating the thermoplastic sheets to a thermoformable temperature,
   said work station four including opposed platens movable vertically between open and closed positions,
   an indexing wheel rotatably supported surrounding said work stations,
   said indexing wheel including four clamp frames movable with said indexing wheel into spaced relations with said four work stations respectively, and
   drive means connected to said indexing wheel for rotating said indexing wheel to advance the three thermoplastic sheets secured to said clamp frames to said work stations one, two, and three for heating and to said work station four for molding each of the three heated thermoplastic sheets into a preselected configuration and fusing the molded sheets together in overlying relation to form a unitary thermoplastic article.

2. Apparatus for thermoform molding three thermoplastic sheets to form a triple sheet molded article comprising:
   a work station,
   three thermoforming molds designated one, two, and three supported on said work station for molding three thermoplastic sheets respectively, each of said three thermoforming molds having an oven for heating said three thermoplastic sheets to a thermoformable temperature,
   a slide assembly mounted on said work station for independently moving two molds in overlying relation into and out of a fixed position on said work station for molding the thermoplastic sheets,
   a first platen and a second platen positioned in overlying spaced relation on said work station for independent movement between open and closed positions,
   said first platen receiving mold one for movement into compressed relation with sheet one,
   said second platen slidably receiving molds two and three in succession for movement into compressed relation with sheets two and three in succession respectively,
   said first platen with said mold one positioned thereon movable to a closed position into contact with sheet one to mold sheet one into a preselected configuration,
   said second platen with said mold two positioned thereon movable to a closed position into contact with sheet two to mold sheet two into a preselected configuration,
   said first and second platen with molded sheets one and two thereon movable into compressed force together molded sheets one and two to form a twin sheet molded sub-assembly,
   said first retaining the twin sheet molded sub-assembly with said second platen slidably exchanging mold two with mold three,
   said second platen with said mold three positioned thereon movable to a closed position into contact with sheet three to mold sheet three into a preselected configuration, and
   said first platen carrying the twin sheet molded sub-assembly into compressed relation with said second platen carrying the molded sheet three to fuse molded sheet three to the twin sheet molded article to form a triple sheet molded article.

3. A thermoforming machine comprising:
   a machine frame;
   three ovens spaced upon the machine frame;
   at least three clamp frames operable to convey three sheets in succession through the three ovens and a form station;
   the form station has a lower platen and an upper platen;
   the lower platen supports a first mold;
   the upper platen is connected to a mold shuttle system, the mold shuttle system holds a second mold and a third mold and is operable to alternately deliver the second mold and the third mold into a supporting position upon the second platen;
   the lower platen is operable to carry the first mold from an open position to a first closed position to thermoform a first sheet, repeatedly carry the thermoformed first sheet to the open position, compress the first mold against the second mold at a second closed position, and compress the first mold against the third mold at a third closed position; and
   the upper platen is operable from an open position to interface with the mold shuttle system, to receive and carry the second mold to a first closed position to thermoform a second sheet, to receive and carry the third mold to a second closed position to thermoform a third sheet, and remain in the first and second closed positions when the lower platen compresses the first mold against the second mold in the first closed position and the third mold in the second closed position.

4. The thermoforming machine of claim 3 further comprising:
   a bolster plate beneath the first mold;
   between the bolster plate and the lower platen a plurality of vertically acting actuators; and
   a controller means causing the actuators to incrementally move the bolster plate vertically compressing the first mold against the second mold in the first closed position and the mold in the second closed position.

5. A thermoforming apparatus comprising:
   a frame;
   at least three spaced apart ovens for heating thermoplastic sheets to a thermoformable temperature;
   a lower platen supported for vertical movement upon the frame;
   a first mold mounted on the lower platen;
   an upper platen supported for vertical movement upon the frame above the lower platen;
   a mold shuttle system supported upon the frame acting with the upper platen;
   a second and third mold mounted for horizontal movement on the mold shuttle system; and
   an controllable actuation means selectively moving the second or third mold horizontally on the mold shuttle system into an engaged position upon the upper platen for vertical movement thereon,
   wherein the first mold, second mold, and third mold are operable to fuse said thermoplastic sheets received from said at least three spaced apart ovens.

6. The triple sheet form station of claim 5 further comprising:
- a plurality of upper gear posts supported upon the frame extending vertically adjacent the upper platen;
- engaging the upper gear posts upper platen gears precisely driven by at least one first motor for selective vertical movement of the upper platen;
- a plurality of gear posts supported upon the frame extending vertically adjacent the lower platen below the upper gear posts;
- engaging the lower gear posts lower platen gears precisely driven by at least one second motor for selective vertical movement of the lower platen below the upper platen; and
- a controller means for selectively controlling the first and second motors for independent and simultaneous precise movement of the upper and lower platens upon the frame.

7. A thermoform tooling apparatus comprising:
- a first oven operable to heat a first thermoplastic sheet;
- a second oven being spaced apart from said first oven, said second oven operable to heat a second thermoplastic sheet;
- a third oven being spaced apart from said first and second ovens, said third oven operable to heat a third thermoplastic sheet;
- a work station being spaced apart from said first, second, and third ovens, said work station having a first platen and a second platen movable relative to each other between a first position and a second position;
- a drive assembly supporting each of said first, second, and third thermoplastic sheets, said drive assembly operable to position said first, second, and third thermoplastic sheets within said first, second, and third ovens, respectively, and further operable to deliver said first, second, and third thermoplastic sheets to said work station for fusing said first, second, and third thermoplastic sheets together.

8. The thermoform tooling apparatus according to claim 7 wherein said drive assembly comprises:
- an indexing wheel having a plurality of frames for supporting said first, second, and third thermoplastic sheets; and
- a drive device operably coupled with said indexing wheel for driving said indexing wheel.

9. The thermoform tooling apparatus according to claim 7, further comprising:
- a first mold mounted on the first platen;
- a mold shuttle system operably coupled with the second platen;
- a second and third mold mounted for horizontal movement on the mold shuttle system; and
- an controllable actuation means selectively moving the second or third mold horizontally on the mold shuttle system into an engaged position upon the second platen for vertical movement thereon.

* * * * *